(12) United States Patent
Cao

(10) Patent No.: US 7,937,943 B2
(45) Date of Patent: May 10, 2011

(54) HEAT ENGINES

(76) Inventor: Yiding Cao, Miami, FL (US)

( * ) Notice: Subject to any disclaimer, the term of this patent is extended or adjusted under 35 U.S.C. 154(b) by 428 days.

(21) Appl. No.: 11/888,981

(22) Filed: Aug. 4, 2007

(65) Prior Publication Data

US 2008/0148731 A1    Jun. 26, 2008

Related U.S. Application Data

(60) Provisional application No. 60/876,751, filed on Dec. 22, 2006.

(51) Int. Cl.
*F02G 3/00* (2006.01)
*F02G 1/04* (2006.01)
*F02G 1/00* (2006.01)
*F03G 6/00* (2006.01)
*F02B 75/02* (2006.01)

(52) U.S. Cl. ............... 60/620; 60/519; 60/524; 60/525; 60/641.8; 60/650; 60/622; 123/64

(58) Field of Classification Search ............... 60/519, 60/525, 650, 517, 682, 641.8, 286, 618, 659, 60/620, 605.2, 622; 123/543, 265, 285–286, 123/41.82 R, 41.76, 41.77, 255, 68, 64
See application file for complete search history.

(56) References Cited

U.S. PATENT DOCUMENTS

| | | | | |
|---|---|---|---|---|
| 961,059 A | * | 6/1910 | Abbott, Jr. | 60/622 |
| 3,751,904 A | * | 8/1973 | Rydberg | 60/525 |
| 4,040,400 A | * | 8/1977 | Kiener | 123/68 |
| 4,074,533 A | * | 2/1978 | Stockton | 60/620 |
| 4,077,221 A | * | 3/1978 | Maeda | 60/650 |
| 4,356,806 A | * | 11/1982 | Freesh | 123/568.12 |
| 4,479,353 A | * | 10/1984 | Schluderberg | 60/659 |
| 4,783,966 A | * | 11/1988 | Aldrich | 60/622 |
| 4,917,054 A | * | 4/1990 | Schmitz | 123/64 |
| 5,072,589 A | * | 12/1991 | Schmitz | 60/620 |
| 5,671,600 A | * | 9/1997 | Pischinger et al. | 60/605.2 |
| 5,875,633 A | * | 3/1999 | Lawson, Jr. | 60/618 |
| 5,944,090 A | * | 8/1999 | Teal | 165/47 |
| 5,983,628 A | * | 11/1999 | Borroni-Bird et al. | 60/286 |
| 6,253,745 B1 | * | 7/2001 | Prater | 123/543 |
| 6,340,013 B1 | * | 1/2002 | Britton | 123/255 |
| 6,553,977 B2 | * | 4/2003 | Schmitz | 60/620 |
| 6,981,377 B2 | * | 1/2006 | Vaynberg et al. | 60/641.8 |

FOREIGN PATENT DOCUMENTS

| | | | | |
|---|---|---|---|---|
| CN | 1804497 A | * | 7/2006 | |
| DE | 2926970 A1 | * | 1/1981 | |
| DE | 4418286 A1 | * | 11/1995 | |
| FR | 2494372 | * | 5/1982 | |
| GB | 131013 A | * | 8/1919 | |
| GB | 241490 A | * | 10/1925 | |
| GB | 528391 A | * | 10/1940 | |
| SU | 1760804 A1 | * | 12/1995 | |

* cited by examiner

*Primary Examiner* — Thai Ba Trieu

(57) ABSTRACT

This invention provides heat engines based on the structure of internal combustion engines and employs a gaseous working fluid without combustion. The heat engine comprises at least a piston and cylinder assembly and each cylinder has at least an associated heating chamber with a heat exchanger unit being disposed therewithin. The chamber may have at least a chamber valve to establish or block the flow of the gaseous working fluid between the heating chamber and cylinder space. The engine is adapted to operate on cycles that enable heat transfer from a heat source to the working fluid while being enclosed within the heating chamber and provides substantially increased heat transfer duration before the power stroke. Therefore the engine may produce sufficiently high power output with reasonably high thermal efficiency.

12 Claims, 24 Drawing Sheets

HEAT ENGINES

CROSS REFERENCES TO RELATED APPLICATIONS

This application is a continuation of provisional application 60/876,751 filed Dec. 22, 2006.

FIELD OF INVENTION

This invention relates to heat engines that convert thermal energy into mechanical energy, in particular related to thermal engines using a gas as the working fluid.

BACKGROUND

A heat engine is an energy system that performs the conversion of thermal energy from a heat source or heat reservoir to mechanical work. A variety of heat sources may be employed to power a heat engine. These heat sources may include, but not limited to, combustion gases from a combustion chamber, exhaust gases from a diesel engine, gasoline engine, or gas turbine engine, flue gases and hot fluids from industrial furnaces or processes, and various non-combustion heat sources related to solar, geothermal, nuclear, or biological energy.

Unlike a heat engine that employs a working fluid without the change of chemical compositions, an internal combustion engine, strictly speaking, does not work in cycles due to the change in chemical composition of the working fluid. Traditionally, however, the operation of an international combustion engine is simplified as cycles for the convenience of analysis. In this regard, the chemical energy associated with a fuel is converted into thermal energy through combustion, and the thermal energy released during combustion is absorbed by the compressed working fluid over a certain time period in a cycle. This time period may be measured in terms of crank angle (CA) or shaft rotating angle. As a result, the thermal energy released in the combustion and absorbed by the working fluid may be expressed by the following relation:

$$Q_c = \int_{\theta_s}^{\theta_e} \dot{Q}_c(\theta) d\theta = \bar{\dot{Q}}_c(\theta_e - \theta_s) = \bar{\dot{Q}}_c \Delta\theta_c \qquad (1)$$

where $\dot{Q}_c$ is the instantaneous combustion heat release rate and $\bar{\dot{Q}}_c$ is the average heat release rate over the combustion duration, both having a unit of J/CA degree, $\theta_s$ is the crank angle at which combustion starts in the combustion chamber, $\theta_e$ is the crank angle at which the combustion ends, and $\Delta\theta_c$ is combustion duration in CA degree. Due to the explosive nature of combustion in a combustion chamber and high average heat release rate, $\bar{\dot{Q}}_c$, the combustion duration is normally small, on the order of 30-40° CA.

For a heat engine, in which the compressed working fluid extracts heat from an external heat source, such as a combustion gas from an external combustion chamber, exhaust gas from a diesel-type, gasoline-type, or gas-turbine engine, solar energy source, geothermal heat source, nuclear energy source, or biological energy source, the acquisition of the thermal energy by the working fluid is normally through a heat exchanger that facilitates heat transfer from the heat source to the working fluid driven by a temperature difference between the heat source and the working fluid. This heat transfer would occur during a time period in a cycle, which could be also measured through crank angle (or shaft rotating angle):

$$Q_{HT} = \int_{\theta_1}^{\theta_2} \dot{Q}_{HT}(\theta) d\theta = \bar{\dot{Q}}_{HT}(\theta_2 - \theta_1) = \bar{\dot{Q}}_{HT} \Delta\theta_{HT} \qquad (2)$$

where $\dot{Q}_{HT}$ is the instantaneous heat transfer rate and $\bar{\dot{Q}}_{HT}$ is the average heat transfer rate over the heat transfer duration, both having a unit of J/CA degree, $\theta_1$ is the crank angle at which the heat transfer begins, $\theta_2$ is the crank angle at which the heat transfer ends, and $\Delta\theta_{HT}$ is the heat transfer duration in CA degree.

It is well known that the heat absorbed by the working fluid in a cycle, either $Q_c$ or $Q_{HT}$, may predominantly determine the power output of an engine at a given engine speed. In many applications, however, with a comparable size the average heat transfer rate, $\bar{\dot{Q}}_{HT}$, in a heat engine may be at least an order of magnitude lower than the average heat release rate of an internal combustion engine, $\bar{\dot{Q}}_c$. As a result, the duration of heat transfer, $\Delta\theta_{HT}$, must be significantly longer than the heat release duration, $\Delta\theta_c$, of an internal combustion engine to provide a sufficiently high $Q_{HT}$ for building a heat engine that could be practically viable. It is also well known that for an engine operating at a given speed, both power output and thermal efficiency will depend on the number of strokes per power stroke in a cycle. For a given heat input in a cycle and a given operating speed, a smaller number of strokes per power stroke will have the benefits of increasing both power output and thermal efficiency due to reduced frictional losses. Therefore, it is very important that an increase in the duration of heat transfer not result in an increase in the number of strokes per power stroke in the cycle.

Turning now to a rotary combustion engine such as a Wankel rotary combustion engine, one of the difficulties is the cooling of rotor seals. In a piston engine, the piston may be adequately cooled by engine oil from an oil sump and by heat conduction from the piston surface to the cylinder wall due to a large contact surface between the piston and cylinder wall. However, these cooling means may be substantially eliminated due to a different structure of the rotary engine. As a result, the rotor temperature, particularly the temperature of the seals at the apexes of the rotor, may be substantially higher than that of a piston. Additionally in a rotary engine, the engine housing is constantly heated on the side of combustion chamber and cooled on the side of intake port, leading to a large temperature gradient along the circumference of the housing, which may cause uneven thermal expansion.

SUMMARY OF THE INVENTION

It is therefore a major objective of this invention to provide a heat engine that has a significantly increased heat transfer duration, $\Delta\Theta_{HT}$, for an increased power output without increasing the number of strokes per power stroke in a cycle. The heat engine comprises at least a piston and cylinder assembly including a piston reciprocatingly mounted within the cylinder space and at least two heating chambers associated with the cylinder. Each of the heating chamber has therewithin a heat exchanger unit that facilitates heat transfer from a heat source to the working fluid of the engine within the chamber, a port leading to the cylinder space, and a heating-chamber valve, the valve opening or closing the port to establish or block communication between the heating chamber and cylinder space. For a heat engine in which the intake and discharge of the working fluid are accomplished through respectively an intake stroke and a discharge stroke, the engine is adapted to operate on a cycle having 4n essential strokes, where n is the number of heating chambers associated with each cylinder. Each of the heating chamber in a cycle has an associated intake stroke wherein an amount of working fluid is admitted into the cylinder space, a compression stroke wherein an amount of working fluid is compressed into the heating chamber, a time period of 4(n−1) strokes available for heat transfer from the heat source to the compressed working fluid enclosed within the heating chamber while the piston works with the working fluid associated with another heating chamber, a power stroke wherein the working fluid with a higher pressure and a higher temperature after the heating period expands from the heating chamber into the cylinder space to deliver work to the piston, and a discharge stroke wherein the expanded working fluid is substantially discharged out of the cylinder space. For a heat engine in which the intake and discharge of the working fluid are realized through a scavenging process, the engine is adapted to operate on a cycle having 2n essential strokes, where n is the number of heating chambers associated with each cylinder. Each of the heating chamber in a cycle has an associated compression stroke wherein an amount of working fluid is compressed into the heating chamber, a time period of 2(n−1) strokes available for heat transfer from the heat source to the compressed working fluid enclosed within the heating chamber while the piston works with the working fluid associated with another heating chamber, a power stroke wherein the working fluid with a higher pressure and a higher temperature after the heating period expands from the heating chamber into the cylinder space to deliver work to the piston, and a scavenging process wherein the expanded working fluid is substantially discharged out of the cylinder space and replaced with an intake working fluid. Thereby a significantly longer period of time may be provided for heating the working fluid by the heat source under a constant volume. Also, since at any given time the engine piston may be always working with the working fluid associated with one of the heating chambers, overall the number of strokes per power stroke in an engine cycle may be independent of the number of the heating chambers per cylinder for a given engine configuration. As a result, many of the operational requirements for an Otto power cycle may be satisfied, and a sufficiently large power output with a reasonably high thermal efficiency may be achieved for the heat engine disclosed herein.

Another objective of this invention is to provide a rotary combustion engine such as a Wankel rotary combustion engine with a significantly more effective cooling means for rotor seals and housing. This is accomplished through the employment of radially rotating heat pipes in the rotor and circumferentially disposed heat pipes in the engine housing.

Yet another objective of this invention is to provide a mechanism to extract a larger amount of thermal energy from the heating fluid related to a heat source. This is accomplished through the flow arrangement of the heating fluid and varying the compression ratio of the heating chambers associated with a cylinder or varying the compression ratio of the cylinders in an engine along the flow path of the heating fluid.

A further objective of this invention is to provide precooling for the intake working fluid of the engine to reduce the temperature of the compressed working fluid near the end of a compression stroke, so that a larger temperature difference is available for heat transfer from the heating fluid to the working fluid enclosed within the heating chamber. The precooling is realized through the cooling of inlet working fluid by a vapor compression refrigeration system, or by a heat driven refrigeration system such as an absorption refrigeration system or an ejector refrigeration system. The heat input to the heat driven refrigeration system may be provided by the heating fluid exiting the heat engine or the hot working fluid discharged out of the heat engine.

DETAILED DESCRIPTION

Figure 1:
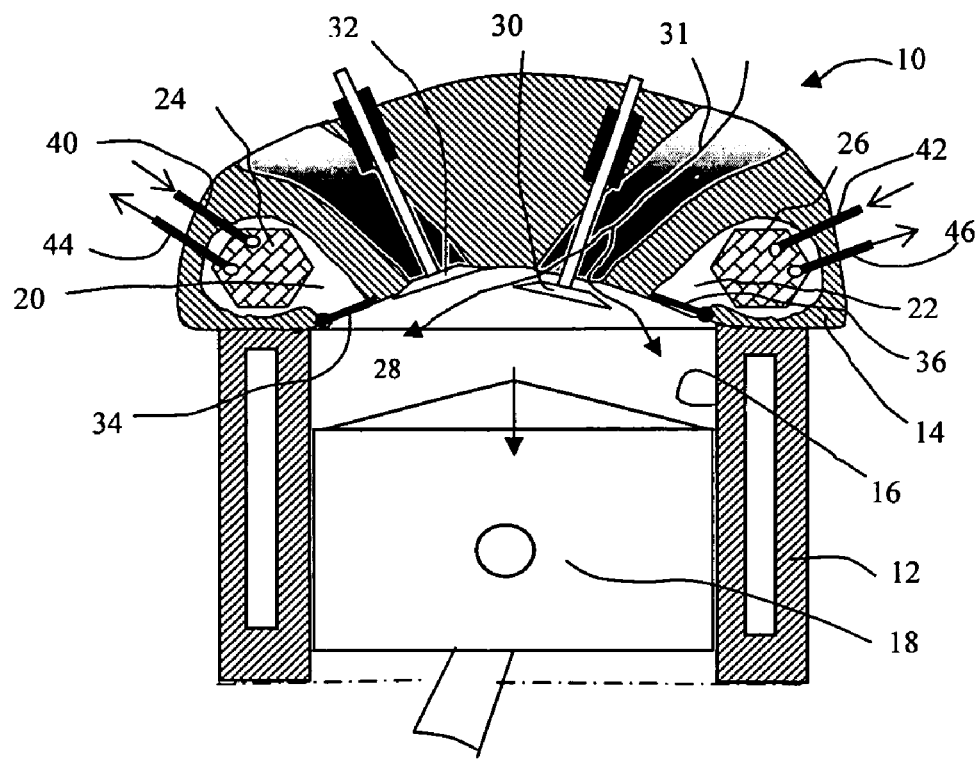
FIG. 1 is a schematic vertical sectional view of a heat engine unit in accordance with the present invention, illustrating the arrangement of two heating chambers as well as the positions of valves and piston during an intake stroke associated with the first heating chamber.
Figure 2:
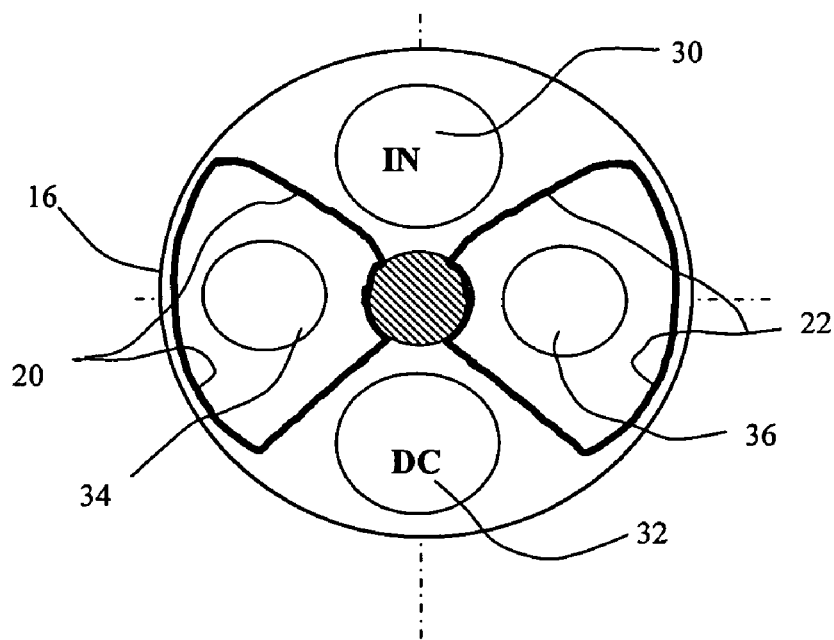
FIG. 2 is a schematic top sectional view of a heat engine unit in accordance with the present invention, illustrating the arrangements of the heating chambers and valves.

FIG. 1 illustrates a heat engine 10 in accordance with the present invention, which includes a cylinder block 12 and a cylinder head 14. The cylinder block 12 contains at least a cylinder 16 and a piston 18 that is slidably disposed within the cylinder 16. Associated with each engine cylinder 16, the cylinder head 14 defines a first heating chamber 20 and a second heating chamber 22. Furthermore, associated with the heating chambers, a first heat exchanger unit 24 and a second heat exchanger unit 26 are disposed, respectively, within the heating chambers 20 and 22. When the piston 18 reaches the top dead center (TC), cylinder space 28, as defined by the bottom face of the cylinder head 14, the top face of the piston 18, and the sidewall of the cylinder 16, may be minimized. The cylinder head is provided with an intake port and a discharge port, and the intake port has an intake valve 30, and the discharge port has a discharge valve 32. Additionally, the first heating chamber 20 is provided with an opening port to the cylinder space. The opening port may be opened or closed by a heating-chamber valve 34 that may establish or block communication between the first heating chamber and the cylinder space. Similarly, the second heating chamber 22 is provided with a heating-chamber valve 36 that may establish or block communication between the second heating chamber and the cylinder space. The heating-chamber valve as illustrated herein is schematic in nature; it may be, but not limited to, a puppet valve, slide valve, rotary valve, butterfly valve, switch valve, gate valve, or ball valve. A schematic top sectional view of a heat engine illustrating a possible arrangement of the heating chambers and valves is shown in FIG. 2. It should be emphasized that the arrangement as shown in FIG. 2 is just one of many possible options; other arrangements such as those maximizing intake and discharge areas by employing multiple intake valves and multiple discharge valves are possible. Also the configuration having more than one chamber valve per chamber is also a possibility.

One skilled in the art may recognize that the piston-cylinder assembly as shown in FIG. 1 is similar to that of a well known internal combustion engine such as an Otto-type or a diesel-type engine. A major difference is that in the present invention the thermal energy supply to the working fluid of the heat engine is through the heat transfer from a heating fluid to the working fluid within the heating chamber instead of combustion. Also, the chemical composition of the working fluid, preferably air, would remain unchanged for most applications. The heat transfer is facilitated through a heat exchanger unit such as 24 or 26 disposed primarily within the heating chamber. The term of a heat exchanger herein refers to a system that facilitates heat exchange between two fluids separated by a wall or between a fluid and a surface receiving heat from a heat source, due to a temperature difference between the two fluids or between the fluid and the surface. In the case as shown in FIG. 1, the heating fluid is separated from the working fluid, and preferably has a sufficiently higher temperature than that of the working fluid. The heating fluid flows into the heat exchanger unit through an inlet conduit such as 40 or 42, and flows out of the heat exchanger unit through an outlet conduit such as 44 or 46. The heating fluid may be a gas, a liquid, or a two-phase liquid-vapor mixture. Since the working fluid is a gas, the heat exchange unit as shown schematically is preferably a compact-type heat exchanger with the inclusion of extended surfaces such as fins at least on the working-fluid side. Various means for heat transfer enhancement on the heating fluid side may also be considered. Additionally, measures would be taken to prevent the leakage of the working fluid once it is enclosed within a heating chamber. Unlike an internal combustion engine, which normally works on a four-stroke cycle or a two-stroke cycle, the heat engine according to the present embodiment as shown in FIG. 1 may be adapted to work on an eight essential stroke cycle. The operation of the heat engine in accordance with the present invention is described in detail with reference to FIGS. 1-9 with air as the working fluid for convenience.

FIG. 1 illustrates representative conditions for the intake stroke associated with the first heating chamber 20, while the second heating chamber 22 has been closed since the completion of the compression stroke in the last cycle, enclosing an amount of compressed air in the second heating chamber, and the enclosed air is being heated up under a constant volume (neglecting potential leakage) by a heating-fluid stream. In this case, the first heating-chamber valve 34 may have the option of being open or closed. A closed position as shown in FIG. 1 may have the benefit of avoiding the contact of the hotter air remaining in the heating chamber with the intake air, thus may have the benefit of reducing compression work or admitting a larger amount of air into the cylinder. Intake valve 30 is wide open while discharge valve 32 is closed. Piston 18 moves downwardly, admitting an amount of air 31 into the cylinder 16.

Figure 3:
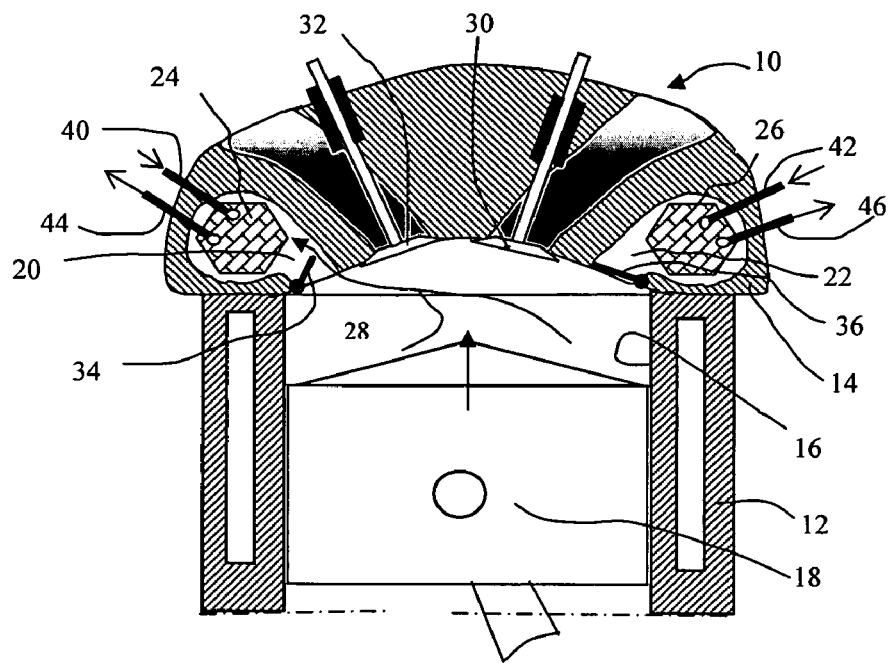
FIG. 3 is a schematic vertical sectional view of a heat engine unit in accordance with the present invention, illustrating the positions of the valves and piston during a compression stroke associated with the first heating chamber.

FIG. 3 illustrates representative conditions for the second stroke, which is the compression stroke associated with the first heating chamber 20. In this case, intake valves 30 and discharge valve 32 are both closed. The first heating-chamber valve 34 is opened at an appropriate time (if it was closed in the preceding intake stroke) while the second heating chamber is still in a closed position. Piston 18 moves upwardly, compressing an amount of intake air into the first heating chamber 20 to a higher pressure.

Figure 4:
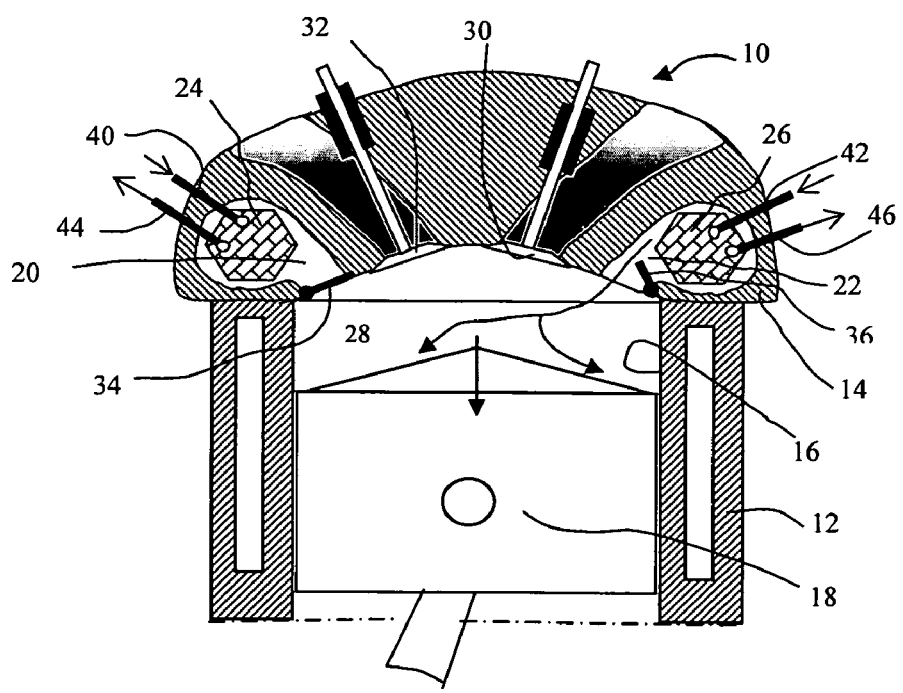
FIG. 4 is a schematic vertical sectional view of a heat engine unit in accordance with the present invention, illustrating the positions of the valves and piston during the power stroke associated with the second heating chamber.

FIG. 4 illustrates representative conditions for the third stroke, which is the power stroke associated with the second heating chamber 22. In this case, both the intake valve 30 and discharge valve 32 remain closed, while the first heating-chamber valve 34 is closed, enclosing an amount of compressed air in the first heating chamber, and the enclosed air is being heated up under a constant volume by a heating-fluid stream. After an amount of heat is received and its temperature and pressure are raised, air with a higher pressure and a higher temperature expands from the second heating chamber 22 into the cylinder space, delivering work to the piston 18.

Figure 5:
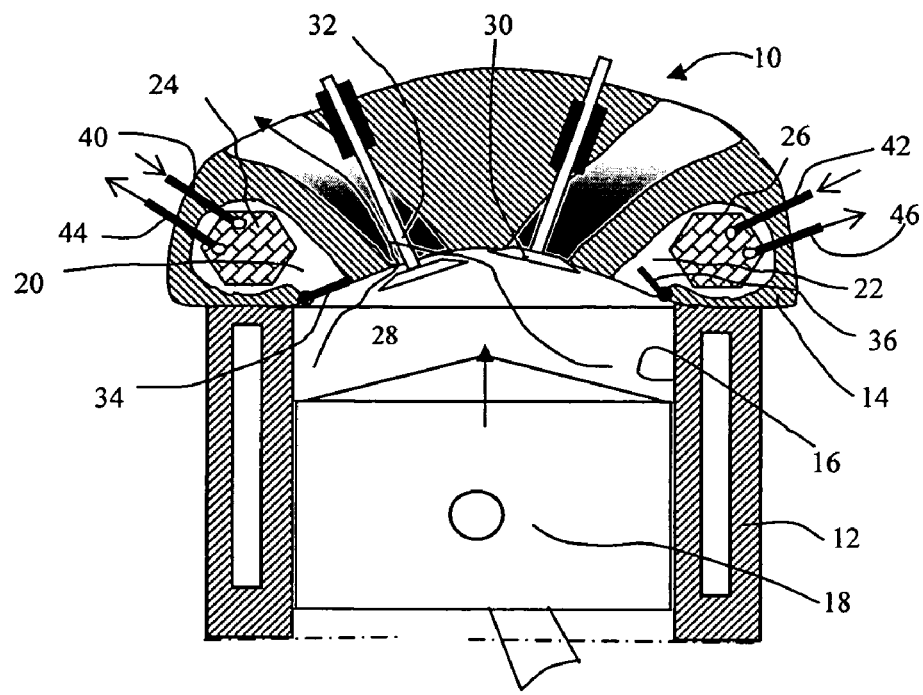
FIG. 5 is a schematic vertical sectional view of a heat engine unit in accordance with the present invention, illustrating the positions of the valves and piston during the discharge stroke associated with the second heating chamber.

FIG. 5 illustrates representative conditions for the fourth stroke, which is the discharge stroke associated with the second heating chamber 22. In this case, intake valves 30 and the first heating chamber remain closed. The discharge valve 32 is opened, discharging expanded air out of the cylinder.

Figure 6:
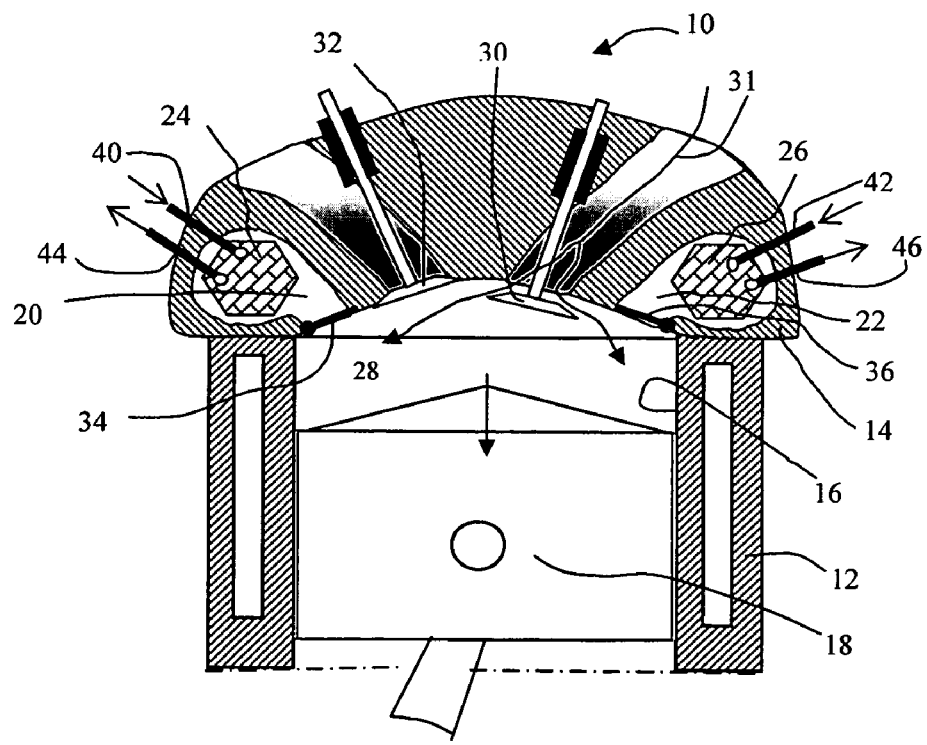
FIG. 6 is a schematic vertical sectional view of a heat engine unit in accordance with the present invention, illustrating the positions of the valves and piston during the intake stroke associated with the second heating chamber.

FIG. 6 illustrates representative conditions for the fifth stroke, which is the intake stroke associated with the second heating chamber 22. In this case, the discharge valve 32 is closed and the intake valve 30 is opened, while the first heating chamber remains closed. Piston 18 moves downwardly, admitting an amount of air into the cylinder. Similar to the intake stroke associated with the first heating chamber, the second heating-chamber valve 36 may have the option of being open or closed. A closed position as shown in FIG. 6 may have the benefit of avoiding the contact of the hotter air remaining in the second heating chamber with the intake air, thus may have the benefit of reducing compression work or admitting a larger amount of air into the cylinder.

Figure 7:
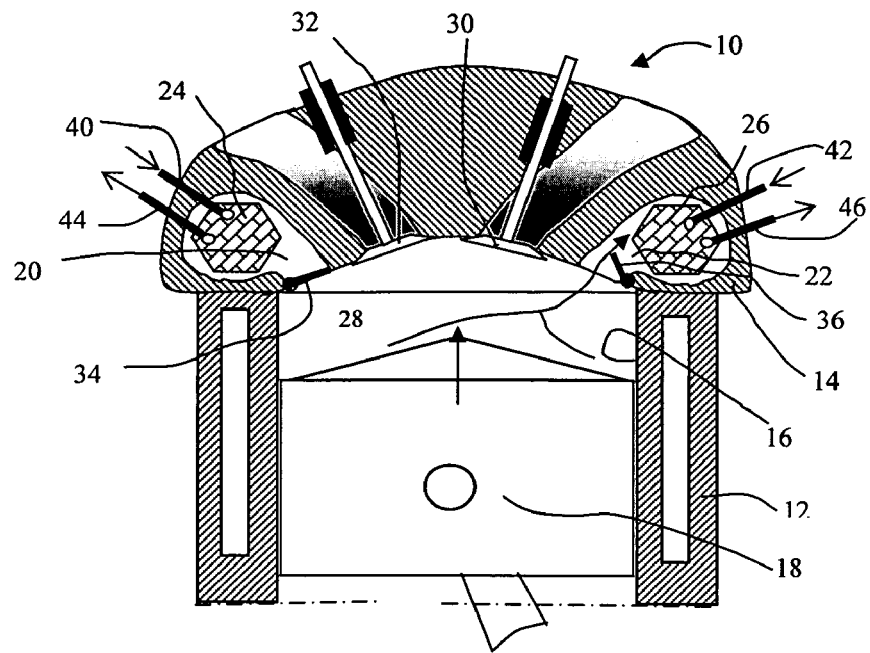
FIG. 7 is a schematic vertical sectional view of a heat engine unit in accordance with the present invention, illustrating the positions of the valves and piston during the compression stroke associated with the second heating chamber.

FIG. 7 illustrates representative conditions for the sixth stroke, which is the compression stroke associated with the second heating chamber 22. In this case, the intake valve 30 is closed while the discharge valves 32 and the first heating chamber remain closed. The second heating chamber valve 36 is opened at an appropriate time (if it was closed in the preceding intake stroke). Piston 18 moves upwardly, compressing an amount of intake air into the second heating chamber 22 to a higher pressure.

Figure 8:
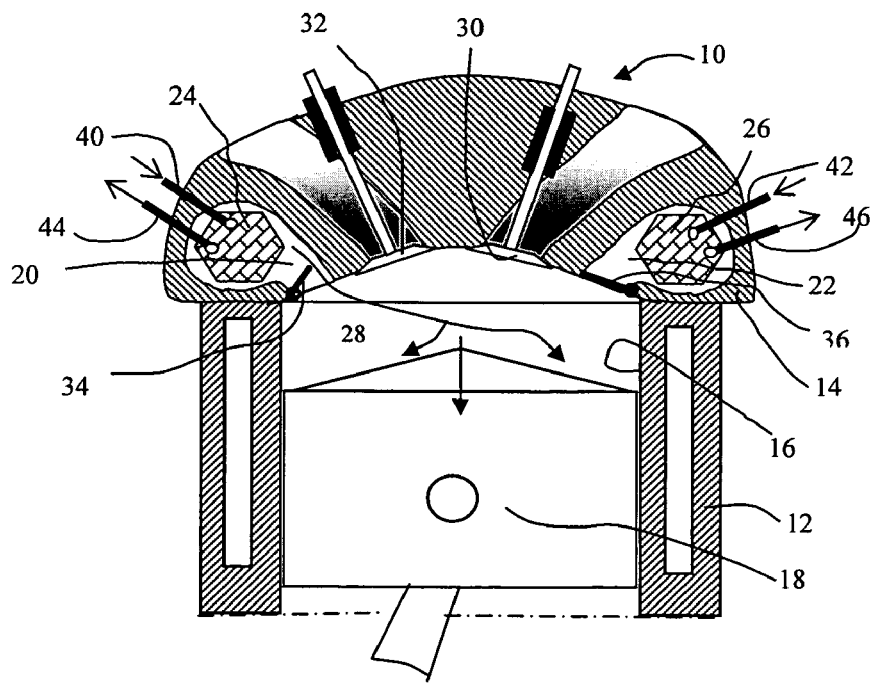
FIG. 8 is a schematic vertical sectional view of a heat engine unit in accordance with the present invention, illustrating the positions of the valves and piston during the power stroke associated with the first heating chamber.

FIG. 8 illustrates representative conditions for the seventh stroke, which is the power stroke associated with the first heating chamber 20. In this case, intake valve 30 and discharge valve 32 are both closed, while the second heating-chamber valve 36 is also closed, enclosing an amount of compressed air in the second heating chamber, and the enclosed air is being heated up under a constant volume by a heating fluid stream. After being enclosed within the first heating chamber and being heated up by the heating fluid through the heat exchanger unit 24 for an extended duration, the higher pressure and higher temperature air expands from the first heating chamber 20 into the cylinder space, delivering work to the piston 18.

Figure 9:
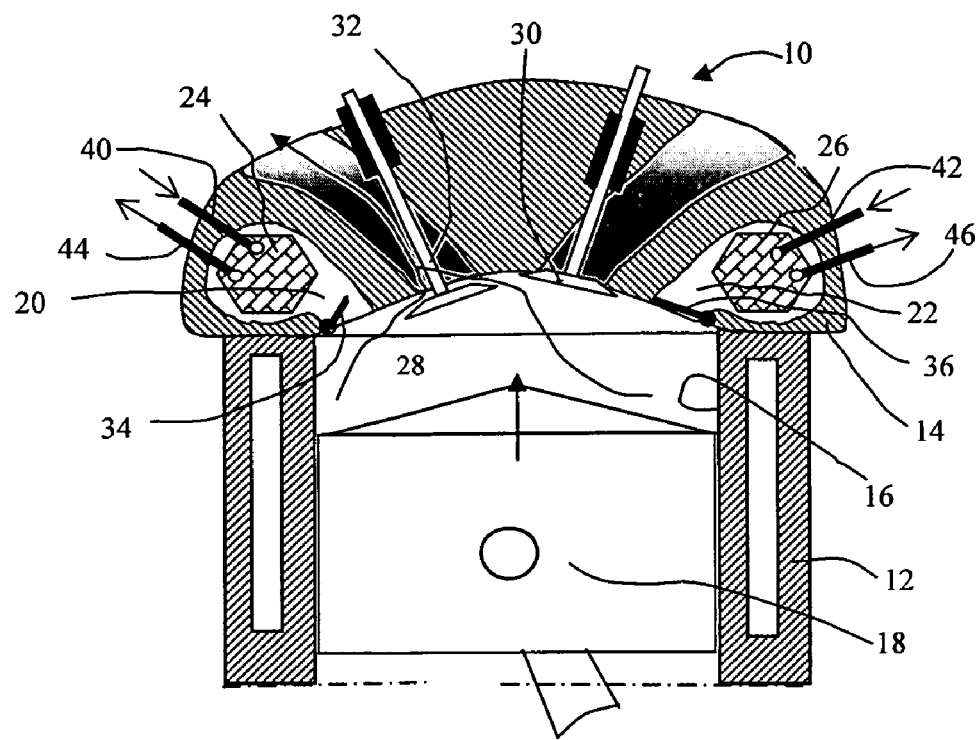
FIG. 9 is a schematic vertical sectional view of a heat engine unit in accordance with the present invention, illustrating the positions of the valves and piston during the discharge stroke associated with the first heating chamber.

FIG. 9 illustrates representative conditions for the eighth stroke, which is the discharge stroke associated with the first heating chamber 20. In this case, the intake valves 30 remains closed and the discharge valve 32 is opened, while the second heating chamber remains closed. After delivering work to the piston in the preceding power stroke, expanded air is discharged out of the cylinder to complete the cycle.

In the above cycle, the number of power strokes is 2 and the number of strokes per power stroke in the cycle is 4, which is the same as the case of an Otto cycle. As a result, an increase in the heat transfer duration has not resulted in an increase in the number of strokes per power stroke in the cycle. The advantage of the above cycle is not limited to the increase in the heat transfer duration to absorb more heat from the heat source for a higher power output. Since most heat transfer from the heat source to the working fluid occurs under a substantially constant volume, the ideal thermal efficiency of the above cycle may follow that of an Otto cycle, which may be critical for the heat engine to maintain a reasonably high thermal efficiency as the compression ratio of the heat engine may be much lower than that of an internal combustion engine in some applications.

Additionally, the cycle described above may be just one of the feasible cycles based on the heat engine platform in accordance with the present invention. For example, in the above cycle, the fifth and sixth strokes associated with the second heating chamber may be replaced by the power stroke and discharge stroke associated with the first heating chamber, and the seventh and eighth strokes associated with the first heating chamber may then be replaced by the intake and compression strokes associated with the second heating chamber. However, with these alternations, the time period for a working fluid to receive heat from a heat source under a constant volume may be cut in half.

One skilled in the art may readily recognize that the eight strokes described above are essential strokes in a cycle according to the present invention. In fact, a heat engine may be adapted to operate on a cycle having any number of strokes. Non-essential strokes to this invention may be added before the first stroke and after the eighth stroke, or be inserted among the eight strokes mentioned above.

One skilled in the art may also readily recognize that the above descriptions on the cycle are based on representative or ideal conditions. However, like prior arts in this field, the general description does not exclude common practices under practical operational considerations. For instance, when it is stated that a first heating chamber is open and a second heating chamber is closed in a compression stroke associated with the first heating chamber, it does not exclude an earlier closing of the first heating chamber before the top dead center and an earlier opening of the second heating chamber for the power stroke associated with the second heating chamber that will follow. Similarly, the common practices of variable valve timing and lift as well as valve overlap periods will be still applicable to the operation of the valves in the present invention. Therefore, in the context of the heating-chamber valves, early/late opening or early/late closing as well as valve overlap periods may be common practices, and in connection with the heating-chamber valves, early/late opening or early/late closing of a heating chamber may also be common practices according to the present invention.

For the two-heating-chamber configuration as shown in FIGS. 1-9, each heating chamber is given a 720 degree of crank angle available for the air enclosed within the chamber to receive heat from the heating fluid. It is obvious that the amount of heat that can be absorbed by the air from a heating stream is directly related to the time period during which the air is in contact with the hotter surfaces of the heat exchanger unit. If this amount of time period (crank angle) is not sufficient, each cylinder may be equipped with more than two heating chambers, and the crank angle available for heating up the air enclosed within a heating chamber will thus be increased accordingly. For example, for a cylinder equipped with three heating chambers, the air entering the first heating chamber during the compression stroke may remain to be enclosed and continue to receive heat from the heating fluid over the next eight strokes serving other heating chambers before the heated air is released from the first heating chamber into the cylinder space to deliver work to the piston. These eight strokes serving other heating chambers may be the power, discharge, intake and compression strokes for a second heating chamber and the power, discharge, intake and compression strokes for a third heating chamber. As a result, the crank angle (CA) available for the compressed air in a heating chamber to receive heat from the heating fluid is $$2 \times 720 = 1440 \, (CA)$$

and the engine may operate on a twelve-stroke cycle. In general, for a cylinder equipped with n heating chambers, where n is an integer, the crank angle that is available for the air enclosed in a heating chamber to receive heat from the heating fluid is:

$$720(n-1)(CA)$$

and the engine may operate on a 4n stroke cycle, where n is an integer greater than or equal to 2. It should be emphasized that the above evaluation is based on the assumption that the operating conditions for all heating chambers in a cyclic are similar, and ideally, the curve of temperature versus time or the curve of pressure versus time associated with a heating chamber may be obtained through shifting in phase the corresponding curve associated with another heating chamber. The above description excludes the existence of non-essential strokes. With the inclusion of non-essential strokes, both the crank angle and the number of strokes in a cycle may be increased. Also for the air remaining within a heating chamber after the completion of a discharge stroke (residual air), the heating time would be even longer. It should be pointed out that although theoretically an engine may be equipped with any number of heating chambers per cylinder, in practice the number of heating chambers per cylinder may be limited due to the space and various operational constraints.

It is understandable that one of the most important components to enable proper operation of the present heat engine is the heating-chamber valve. As mentioned before, the heating-chamber valve may be a commonly used valve, such as a puppet valve, slide valve, rotary valve, butterfly valve, switch valve, gate valve, sleeve valves or ball valve, or another less commonly known valve, depending on specific design requirements. Although the intake and discharge valves as shown in FIGS. 1-9 are puppet valves, they may be replaced by other types of valves, as the working temperature and pressure in a heat engine may be much lower as compared to those in an internal combustion engine. Additionally the cylinder bore may be much bigger than that of an internal combustion engine due to a much lower operating pressure.

Figure 10:
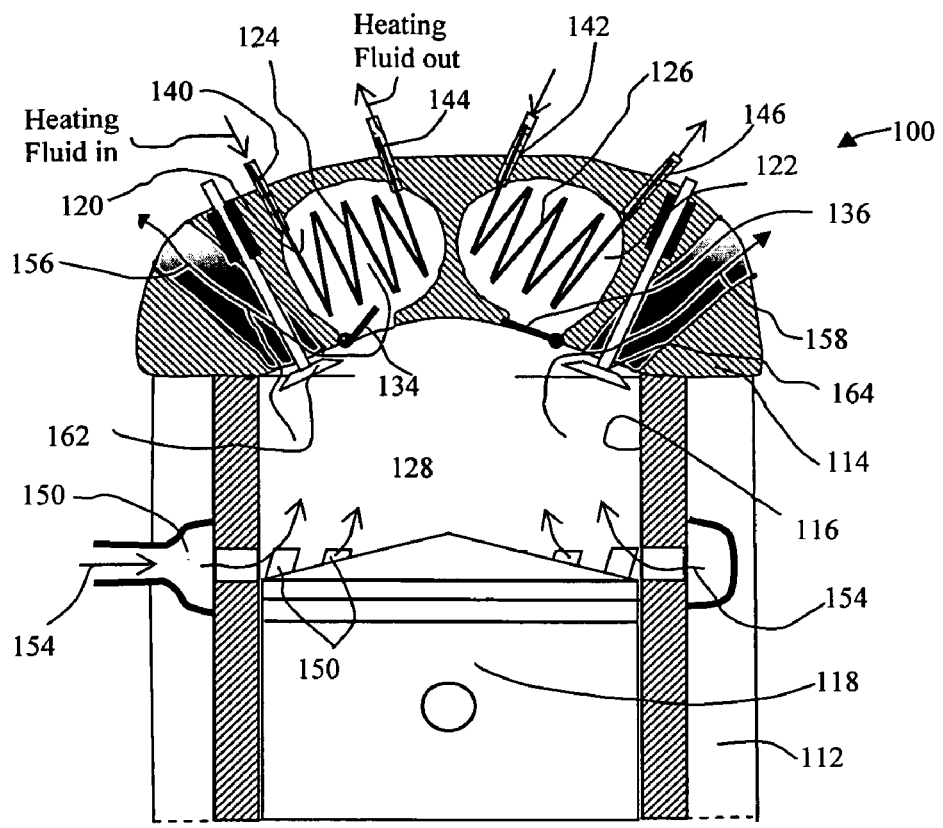
FIG. 10 is a schematic vertical sectional view of a heat engine unit in accordance with the present invention, illustrating the positions of the valves and piston during the scavenging process associated with the first heating chamber.

The heat engine presented above is based on the structure of a four-stroke type internal combustion engine wherein intake and discharge are realized respectively through an intake stroke and a discharge stroke. Since the indicated mean effective pressure of a heat engine may be substantially lower than that of an internal combustion engine, the frictional loss associated with the intake and discharge strokes may represent a much larger portion of the indicated power output, and thus cause a significant reduction in the brake power output of a heat engine. For this reason, a heat engine based on the structure of a two-stroke type internal combustion engine may be constructed to reduce the losses associated with the intake and discharge strokes. FIG. 10 illustrates such a heat engine 100, wherein the intake and discharge of the working fluid are realized through a scavenging process. The engine 100 includes a cylinder block 112 and a cylinder head 114. The cylinder block 112 contains at least a cylinder 116 and a piston 118 that is slidably disposed within the cylinder 116. When the piston 118 reaches the top dead center, cylinder space 128, as defined by the bottom face of the cylinder head 114, the top face of the piston 118, and the sidewall of the cylinder 116, may be minimized. Associated with each engine cylinder 116, the cylinder head 114 defines a first heating chamber 120 and a second heating chamber 122. Furthermore associated with the heating chambers, a first heat exchanger unit 124 and a second heat exchanger unit 126 are disposed, respectively, within the heating chambers 120 and 122. The heating fluid flows into the heat exchanger unit through an inlet conduit such as 140 or 142, and flows out of the heat exchanger unit through an outlet conduit such as 144 or 146. The first heating chamber 120 is provided with an opening port to the cylinder space. The opening port may be opened or closed by a heating-chamber valve 134 that may establish or block communication between the first heating chamber and the cylinder space. Similarly, the second heating chamber 122 is provided with a heating-chamber valve 136 that may establish or block communication between the second heating chamber and the cylinder space. The heating-chamber valve as illustrated herein is schematic in nature; it may be, but not limited to, a puppet valve, slide valve, rotary valve, butterfly valve, switch valve, gate valve, or ball valve. The scavenging method as shown in FIG. 10 is a through scavenge or uniform scavenge, which uses inlet ports in the cylinder wall, uncovered by the piston 118 as it approaches the bottom dead center. Fresh charge 154, such as a slightly compressed air, flows into the cylinder space and pushes out the expanded working fluid in the cylinder through discharge ports opened by discharge valves 162 and 164. The heat engine according to the present embodiment as shown in FIG. 10 may be adapted to work on a four essential stroke cycle, and the operation of the heat engine is described in detail with reference to FIGS. 10-15, with air as the working fluid for convenience.

FIG. 10 illustrates representative conditions for the scavenging process associated with the first heating chamber 120, while the second heating chamber 122 has been closed since the completion of the compression stroke in the last cycle, enclosing an amount of compressed air in the chamber, and the enclosed air is being heated by a heating-fluid stream. In this process, when the piston 118 approaches the bottom dead center, the discharge valves 162 and 164 are opened and expanded working fluid in the cylinder space as well as in the first heating chamber 120 may rush out of the cylinder and heating chamber due to a somewhat higher pressure compared to the discharge port pressure after delivering an amount of work in a power stroke in the preceding cycle. Intake charge 154 such as a slightly compressed air flows into the cylinder through the inlet ports 150 in the cylinder wall uncovered by the piston to push remaining expanded working fluid out of the cylinder.

Figure 11:
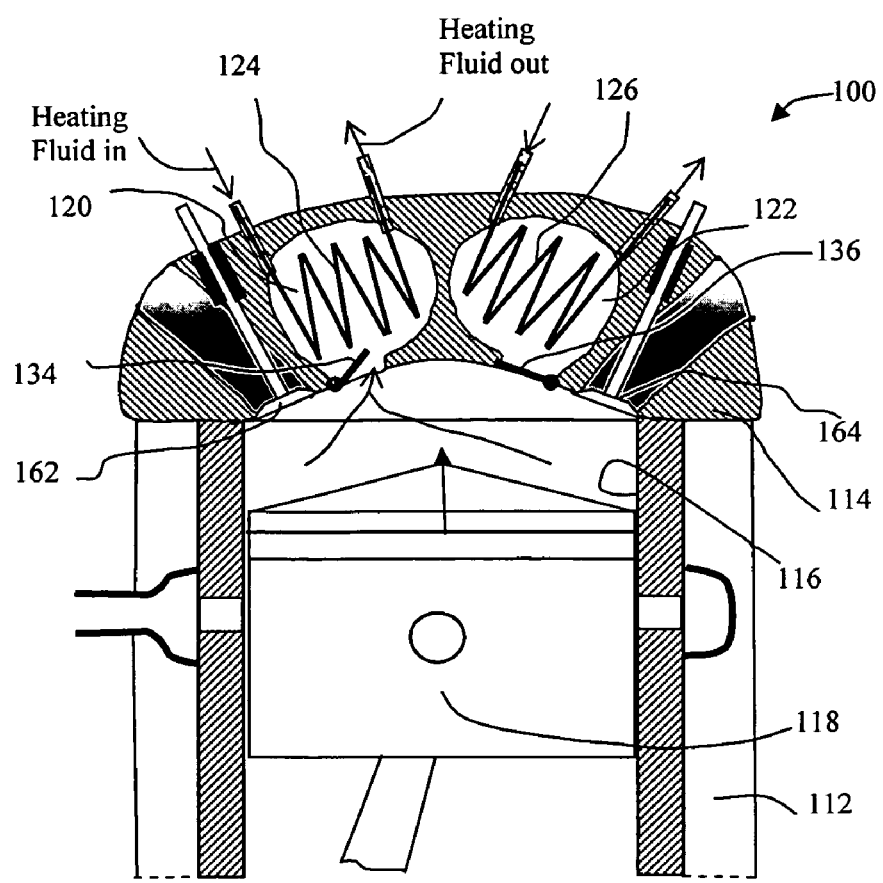
FIG. 11 is a schematic vertical sectional view of a heat engine unit in accordance with the present invention, illustrating the positions of the valves and piston during the compression stroke associated with the first heating chamber.

FIG. 11 illustrates representative conditions for the first stroke, which is the compression stroke associated with the first heating chamber 120. In this case, discharge valves 162 and 164 are closed, and the piston 118 moves from the bottom dead center to the top dead center, closing the inlet ports 150, while the second heating chamber is still in a closed position. As the piston 118 moves upwardly, it compresses an amount of intake working fluid into the first heating chamber 120 to a higher pressure.

Figure 12:
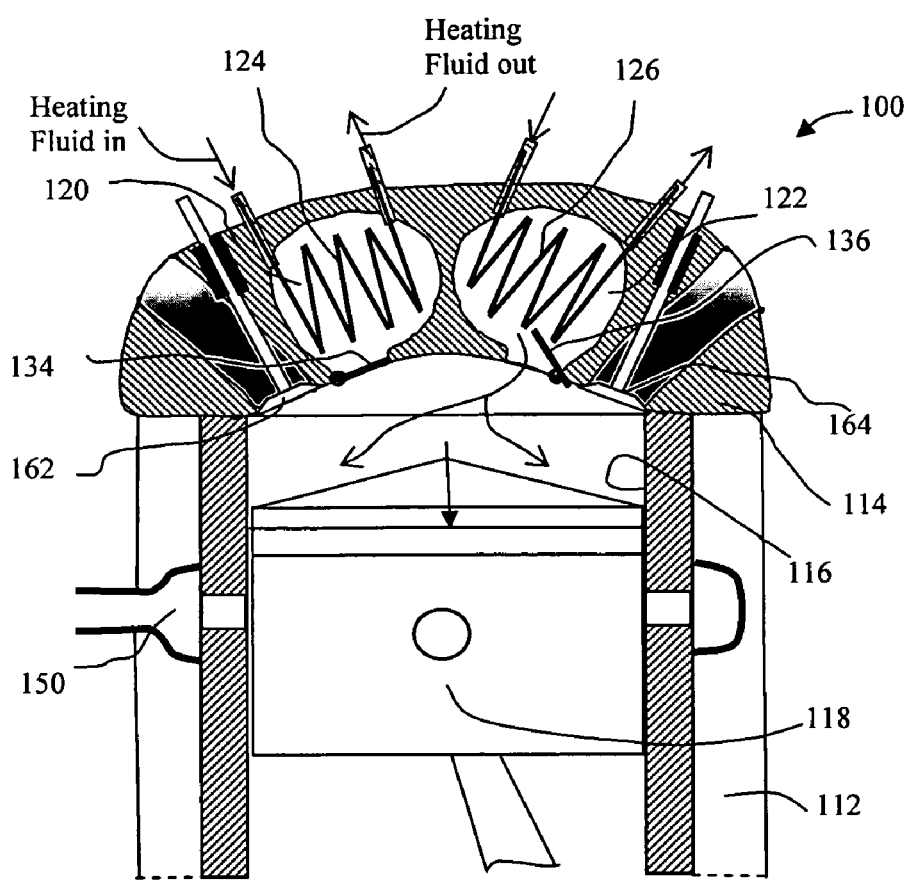
FIG. 12 is a schematic vertical sectional view of a heat engine unit in accordance with the present invention, illustrating the positions of the valves and piston during the power stroke associated with the second heating chamber.

FIG. 12 illustrates representative conditions for the second stroke, which is the power stroke associated with the second heating chamber 122. In this case, the discharge valves 162 and 164 remain closed, while the first heating-chamber valve 134 is closed, enclosing an amount of compressed working fluid in the first heating chamber, and the enclosed working fluid is being heated by a heating-fluid stream. After an extended heating period, the working fluid with a higher pressure and a higher temperature expands from the second heating chamber 122 into the cylinder space, delivering work to the piston 118.

Figure 13:
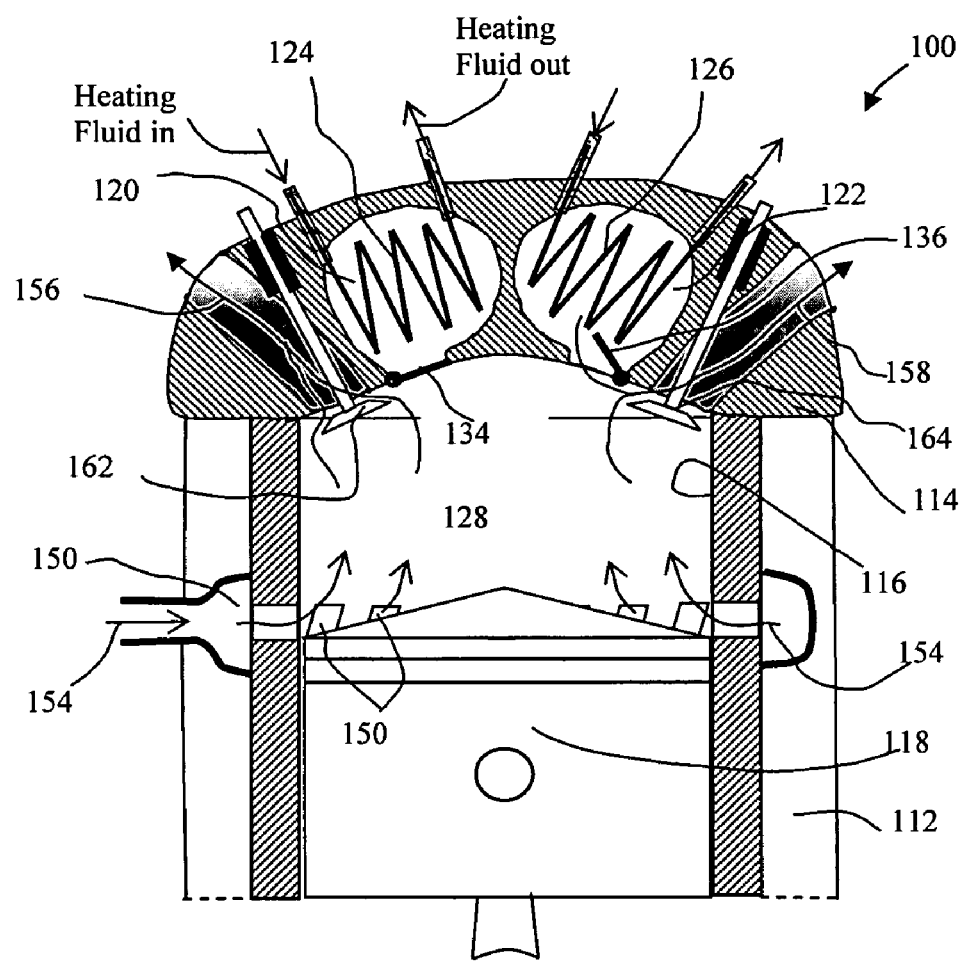
FIG. 13 is a schematic vertical sectional view of a heat engine unit in accordance with the present invention, illustrating the positions of the valves and piston during the scavenging process associated with the second heating chamber.

FIG. 13 illustrates representative conditions for the scavenging process associated with the second heating chamber 122, while the first heating chamber 120 remains in a closed condition. In this process, when the piston 118 approaches the bottom dead center, the discharge valves 162 and 164 are opened, the expanded working fluid in the cylinder space as well as in the second heating chamber may rush out of the cylinder and the second heating chamber due to a somewhat higher pressure compared to the discharge port pressure after delivering an amount of work in the preceding power stroke. Intake charge 154, such as a slightly compressed air, flows into the cylinder through inlet ports 150 in the cylinder wall uncovered by the piston to push remaining expanded working fluid out of the cylinder.

Figure 14:
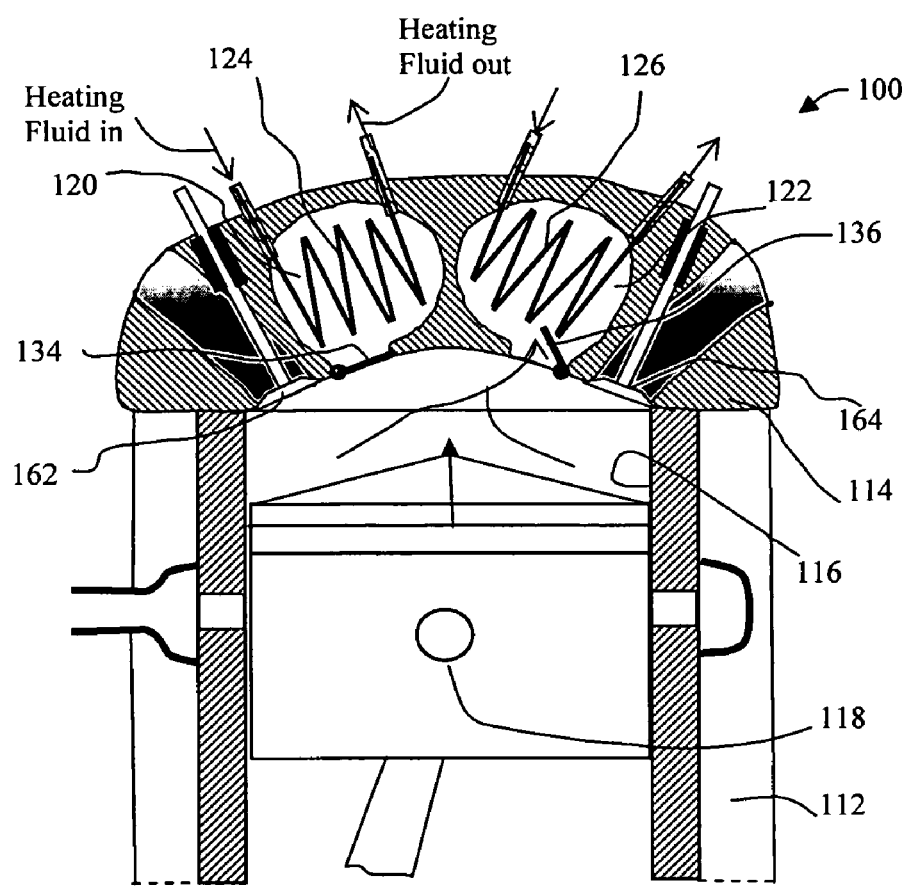
FIG. 14 is a schematic vertical sectional view of a heat engine unit in accordance with the present invention, illustrating the positions of the valves and piston during the compression stroke associated with the second heating chamber.

FIG. 14 illustrates representative conditions for the third stroke, which is the compression stroke associated with the second heating chamber 122. In this case, discharge valves 162 and 164 are closed, and the piston 118 moves from the bottom dead center to the top dead center, closing the inlet ports 150, while the first heating chamber is still in a closed position. As the piston 118 moves upwardly, it compresses an amount of intake working fluid into the second heating chamber 122 to a higher pressure.

Figure 15:
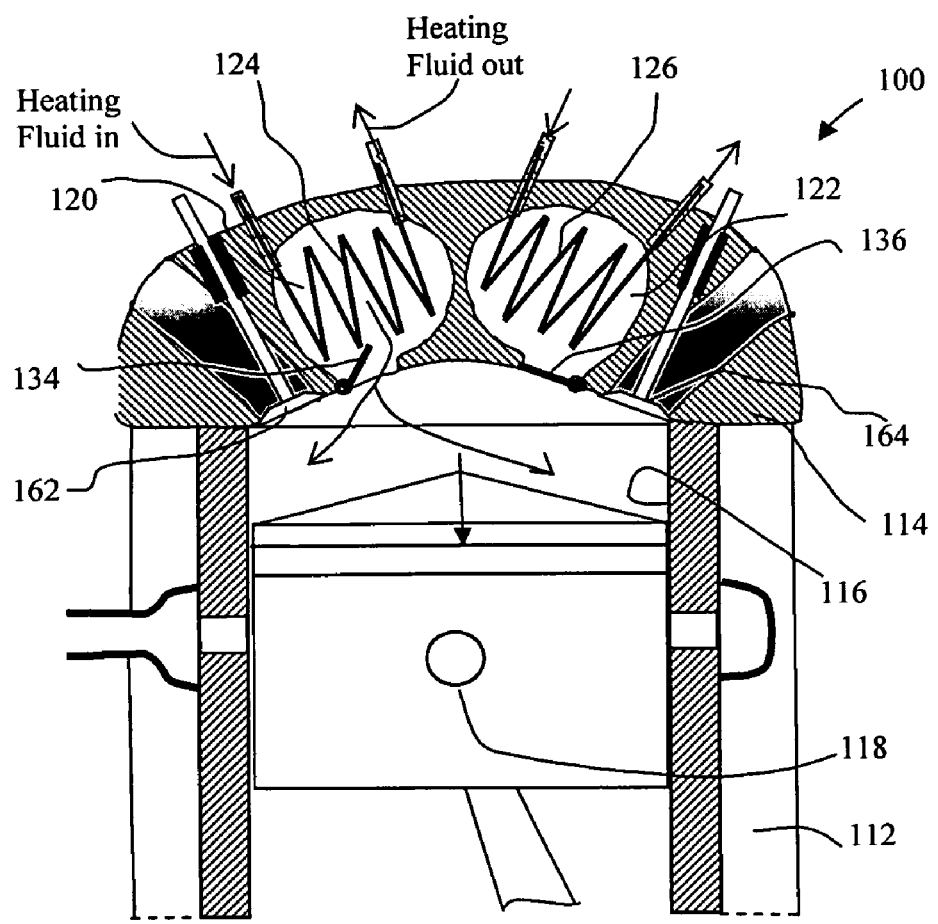
FIG. 15 is a schematic vertical sectional view of a heat engine unit in accordance with the present invention, illustrating the positions of the valves and piston during the power stroke associated with the first heating chamber.

FIG. 15 illustrates representative conditions for the fourth stroke, which is the power stroke associated with the first heating chamber 120. In this case, the discharge valves 162 and 164 remain closed, while the second heating-chamber valve 136 is closed, enclosing an amount of compressed working fluid in the second heating chamber, and the enclosed working fluid is being heated by a heating-fluid stream. After an extended heating period, the working fluid with a higher pressure and a higher temperature expands from the first heating chamber 120 into the cylinder space, delivering work to the piston 118 to complete the cycle.

In the above cycle, the number of power strokes is 2 and the number of strokes per power stroke in the cycle is 2, which is the same as the case of a two-stroke internal combustion engine. As a result, an increase in the heat transfer duration has not resulted in an increase in the number of strokes per power stroke in the cycle.

For the two-heating-chamber configuration as shown in FIGS. 10-15, each heating chamber is given a 360 degree of crank angle available for the working fluid enclosed within the chamber to receive heat from the heating fluid. If this amount of time period (crank angle) is not sufficient, each cylinder may be equipped with more than two heating chambers, and the crank angle available for heating up the working fluid enclosed within a heating chamber will thus be increased accordingly. In general, for a cylinder equipped with n heating chambers, where n is an integer, the crank angle that is available for a compressed working fluid enclosed in a heating chamber to receive heat from the heating fluid is:

$$360(n-1)(CA)$$

and the engine may operate on a 2n stroke cycle, where n is an integer greater than or equal to 2. It should be emphasized that the above evaluation is based on the assumption that the operating conditions for all heating chambers in a cyclic are similar, and ideally, the curve of temperature versus time or the curve of pressure versus time associated with a heating chamber may be obtained through shifting in phase the corresponding curve associated with another heating chamber.

For the heat engine configurations as described above, the energy transfer from a heat source to the working fluid is realized through an intermediate heating fluid, which may be the cases for an external combustion engine wherein the heating fluid is the combustion gas coming out from an external combustion chamber, for exhaust energy recovery wherein the heating fluid is an exhaust gas from an internal combustion engine, a gas turbine engine, or an industrial process, for a thermal solar energy power plant wherein the heating fluid would come from a solar energy receiver, for geothermal power plant wherein the heating fluid is the hot water or steam from the underground, or for a nuclear power plant wherein the heating fluid may be the coolant of a nuclear reactor. In some situations particularly for energy recovery from the exhaust gas of a combustion engine, the heat engine described herein may be integrated with a combustion engine and a cylinder in the heat engine may be an additional cylinder of the combustion engine, sharing the same crank shaft and other components with the cylinders of the combustion engine.

Figure 15A:
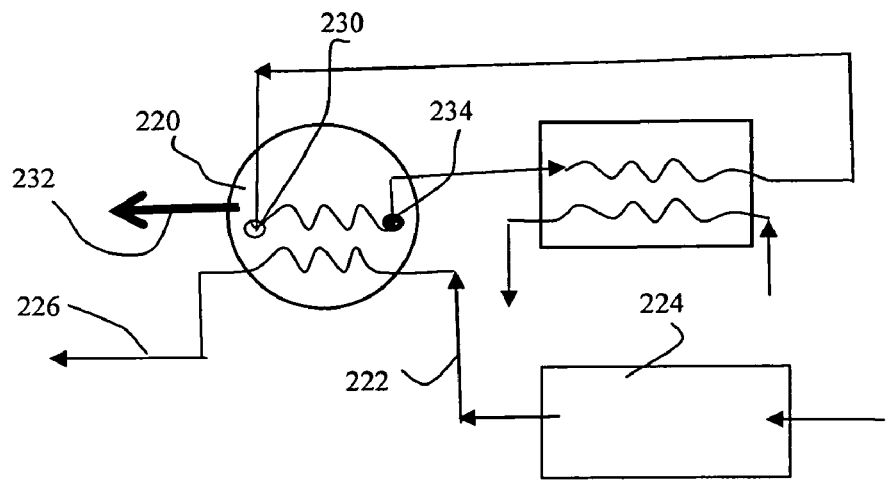
FIG. 15a is an exemplary illustration of a heat engine using the combustion gas from an external combustion chamber as the heat source.
Figure 15B:
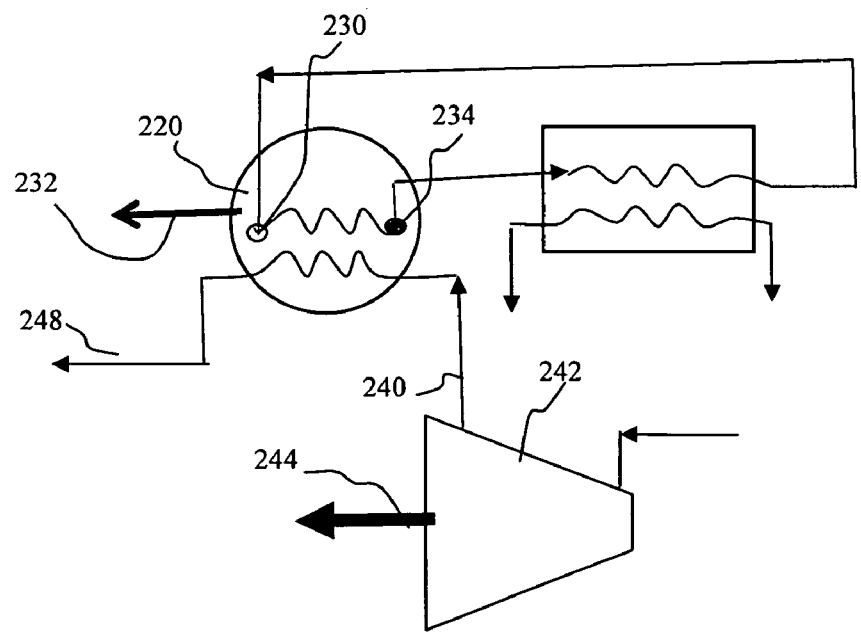
FIG. 15b is an exemplary illustration of a heat engine using the exhaust gas from a combustion engine as the heat source.
Figure 15C:
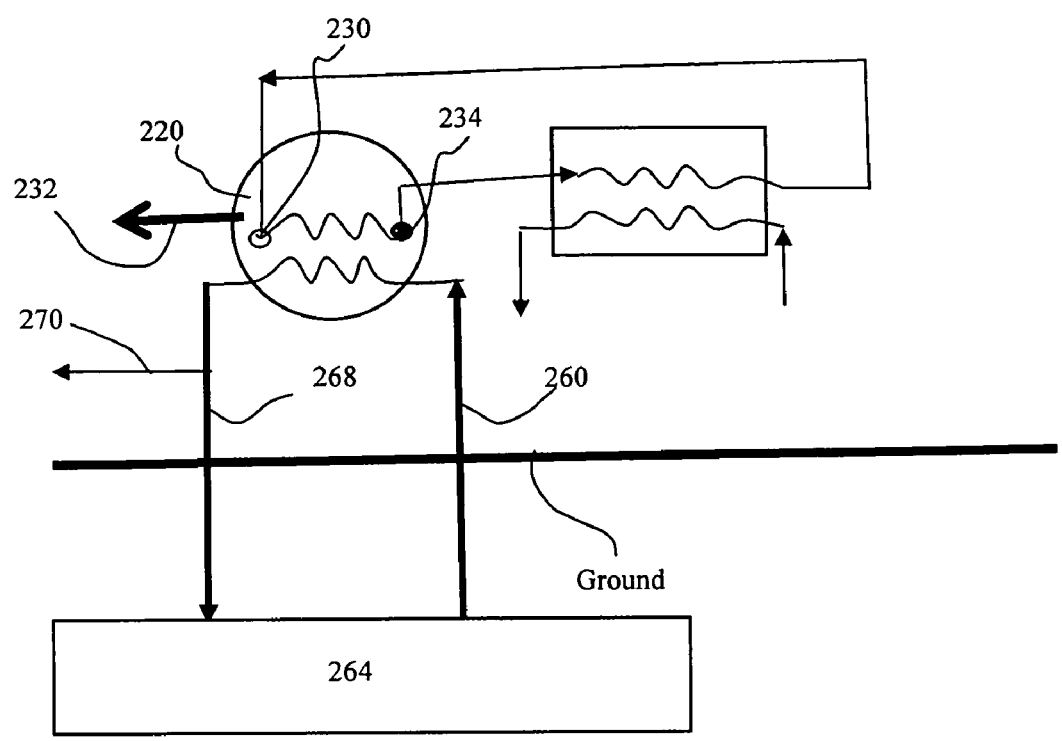
FIG. 15c is an exemplary illustration of a heat engine using geothermal energy as the heat source.

FIG. 15a shows schematically a heat engine 220 using the combustion gas 222 from an external combustion chamber 224 as the heat source. After supplying an amount of heat to the heat engine, the combustion gas 226 may be directly discharged into the ambient or used for other thermal purposes. The working fluid of the heat engine enters the heat engine through an intake port 230. After receiving an amount of heat from the combustion gas and developing an amount of net work 232, the working fluid exits the heat engine through a discharge port 234. The combustion gas 222 may be replaced by the exhaust gas 240 of a combustion engine 242 after developing an amount of net work 244 (FIG. 15b). After supplying an amount of heat to the heat engine, the exhaust gas 248 may be directly discharged into the ambient or used for other thermal purposes. As discussed earlier, the geothermal energy may be employed to power the heat engine. FIG. 15c shows schematically a geothermal energy powered heat engine, wherein hot water or steam is delivered to the heat engine through a production well 260 from an underground resource 264. After supplying an amount of heat to the heat engine, the fluid may return to the underground resource 264 through an injection well 268. Alternatively, the fluid 270 exiting the heat engine may be used for other thermal processes.

On the other hand, the thermal energy may be directly transferred from a heat source to the working fluid of the heat engine without an intermediate fluid. For example in a thermal solar energy power plant, a surface of a heat exchange unit may directly receive energy from a solar beam and the heat is transferred to a surface having a direct contact with the working fluid. The heat is subsequently transferred from the surface to the working fluid of the heat engine. Alternatively, the energy from a heat source may be first transferred to a heat transfer device, such as a heat pipe system including a separate-type heat pipe system or a capillary pumped loop system, and the heat transfer device then passes the received heat to the working fluid of the heat engine.

Figure 16A:
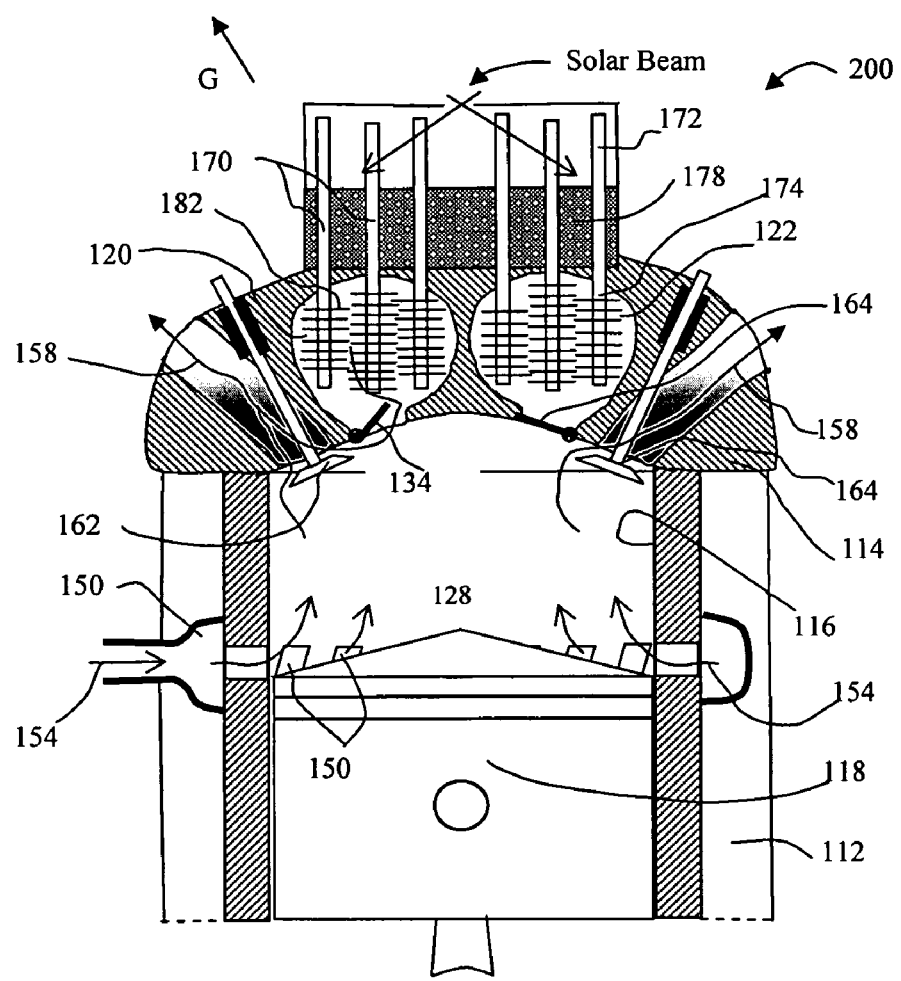
FIG. 16a is a schematic vertical sectional view of a heat engine unit in accordance with the present invention, illustrating an engine configuration employing a heat pipe system to transfer heat from a heat source to the working fluid of the engine.

FIG. 16a shows schematically a configuration of a heat engine employing a heat pipe heat exchanger 170 as an intermediate heat transfer device. The energy received from the solar beam in the evaporator section 172 of the heat pipe is transferred to the condenser section 174 of the heat pipe that is located inside the heating chamber of the engine, wherein the heat is transferred from the condenser section to the working fluid of the engine. To reduce the power output fluctuation of the engine due to the fluctuation in the intensity of the incoming solar beam, a heat storage material 178 may be used in conjunction with the heat pipe system, which could have a capability to maintain the temperature of the heat pipe condenser section within a narrow range over a certain time period. The direction of the gravitational field G as shown in FIG. 16a would also help the return of the condensate in a heat pipe from the condenser section 174 to the evaporator section 172. To enhance the heat transfer from the condenser section to the working fluid of the engine, fins 182 may be attached to the condenser outer surfaces, as shown in the figure.

In the above disclosures, multiple heating chambers are employed for increasing the heat transfer duration for enclosed working fluid. However, the increase of heat transfer duration may also be realized with a single heating chamber per cylinder (not shown). In this configuration, after an amount of working fluid is compressed into a heating chamber in the compression stroke, the working fluid may remain to be enclosed within a heating chamber during the following strokes. However, the piston may not have an opportunity to serve another heating chamber during the following strokes, and as a result the number of strokes per power stroke in a cycle will be increased by at least 2.

Figure 16B:
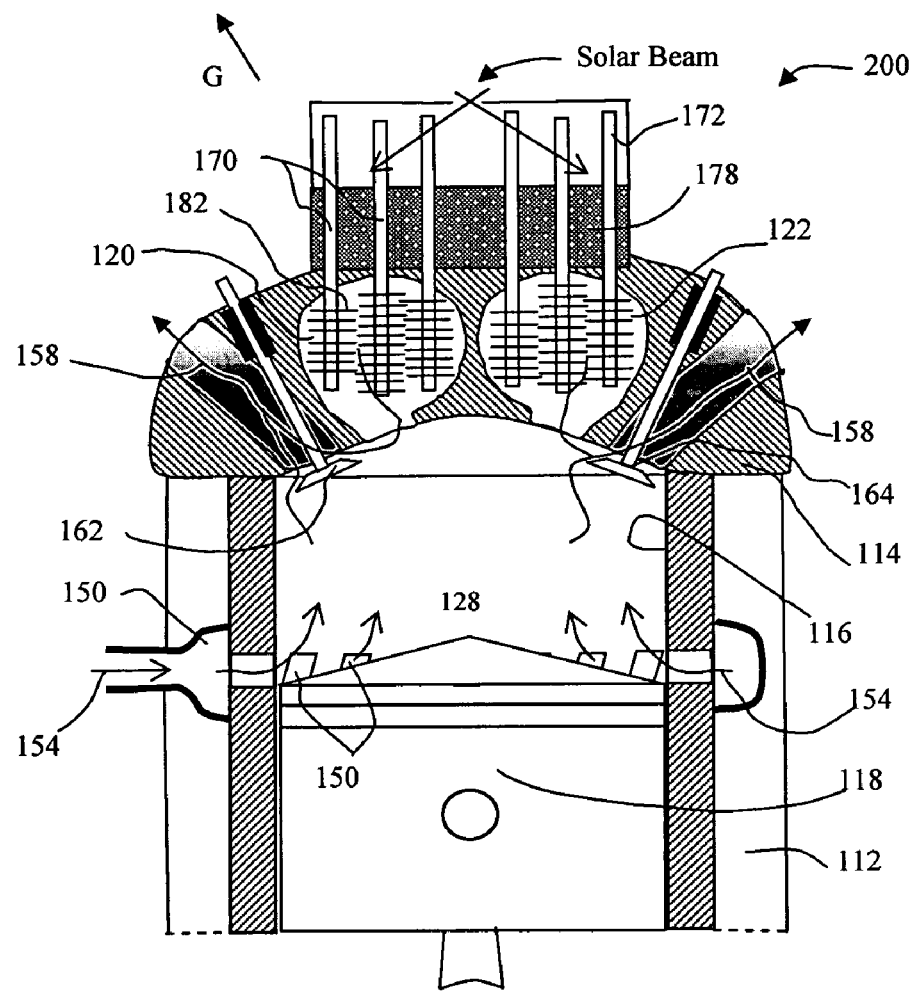
FIG. 16b is a schematic vertical sectional view of a heat engine unit in accordance with the present invention, illustrating an engine configuration employing a heat pipe system to transfer heat from a heat source to the working fluid of the engine without employing a heating chamber valve.
Figure 16C:
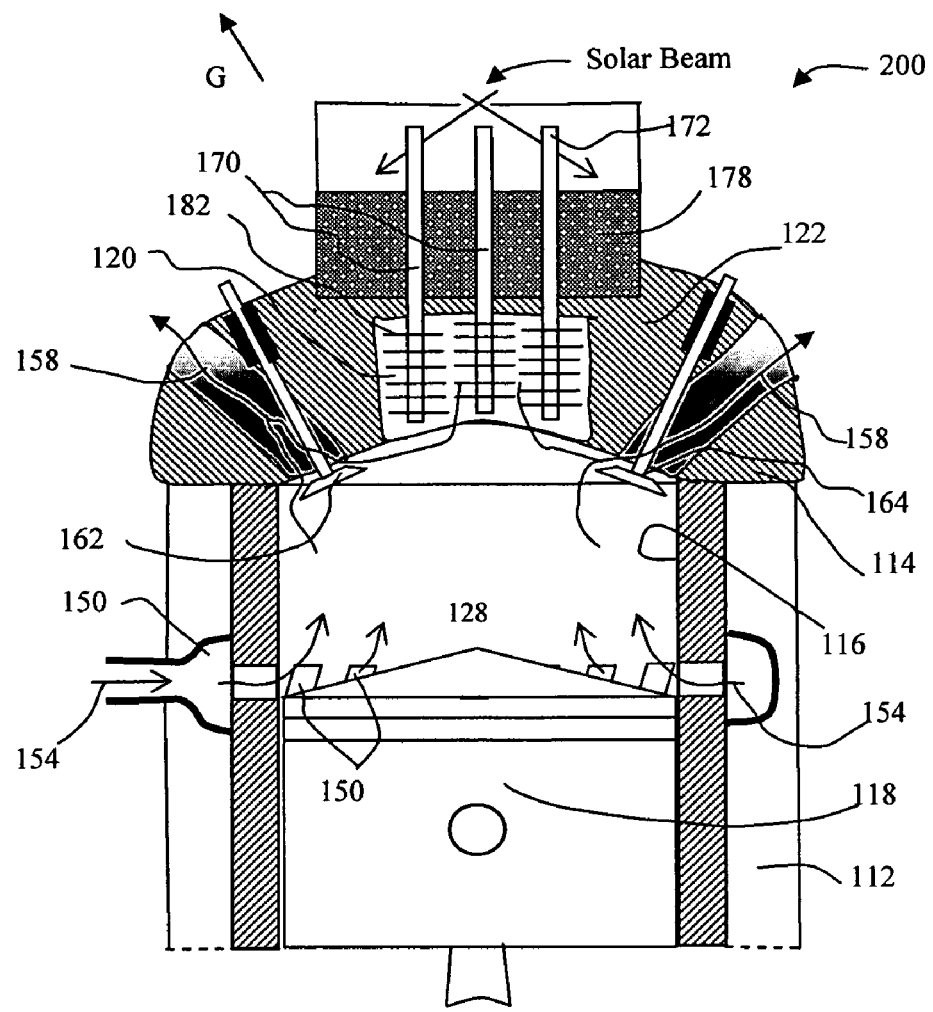
FIG. 16c is a schematic vertical sectional view of a heat engine unit in accordance with the present invention, illustrating an engine configuration employing a heat pipe system to transfer heat from a heat source to the working fluid of the engine with a single heating chamber.

In a further situation, if the heat transfer coefficient on the heating fluid side is very high or the heat transfer occurs through an intermediate heat transfer device such as a heat pipe system, the overall heat transfer coefficient between the heat source and the working fluid is largely controlled by the heat transfer coefficient on the working fluid side. If the heat transfer coefficient on the working fluid side is very high for some particular conditions, such as a large compression ratio, a high rotating speed, or a working fluid having a high thermal conductivity, the crank angle in the vicinity of the top dead center may be sufficient to provide enough amount of heat from the heat source to the working fluid. In this case, a single heating chamber or interconnected multiple pre-chamber configuration may be employed. FIG. 16b illustrates one of such configurations with the removal of chamber valves from the configuration in FIG. 16a. In this case, the working fluid will not be enclosed after the compression stroke is complete and the engine may operate on a two-stroke cycle. Another example with a single heating chamber is schematically shown in FIG. 16c in which the concept of squish is used to enhance the motion of working fluid in the heating chamber 120. To increase the heat transfer on the working fluid side, other means such as swirl and tumble may be also employed in addition to pre-chamber and squish discussed earlier.

Figure 17:
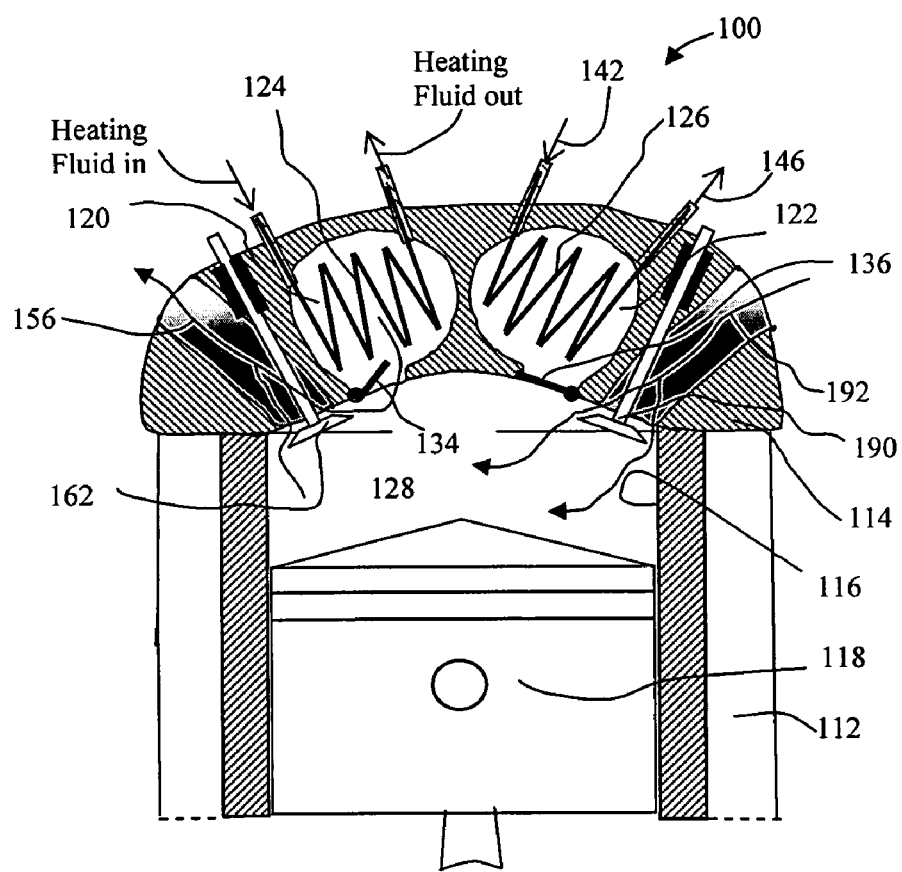
FIG. 17 is a schematic vertical sectional view of a heat engine unit in accordance with the present invention, illustrating the positions of the valves and piston during a cross scavenging process through the intake and discharge valves in the engine head.

The heat engine as shown in FIGS. 10-16 employs a typical through scavenging or uniform scavenging process for discharge and intake purposes. However, other scavenging processes such as through scavenging via opposed pistons, crankcase scavenging, cross scavenging, cross scavenging with discharge valves, loop scavenging, or other scavenging processes not mentioned herein may be equally applicable based on the principle of the present invention, although they are not shown here. A particular cross scavenging process utilizing the intake and discharge ports in the cylinder head instead of the intake ports in the cylinder wall is illustrated in FIG. 17, which represents a scavenging process for the heating chamber 120. In this case, when the piston 118 approaches the bottom dead center, discharge valve 162 opens up the discharge port, which is followed by the opening of the intake port through the intake valve 190. Intake charge 192 flows into the cylinder and displaces expanded working fluid 156 in the cylinder and heating chamber 120.

Figure 18:
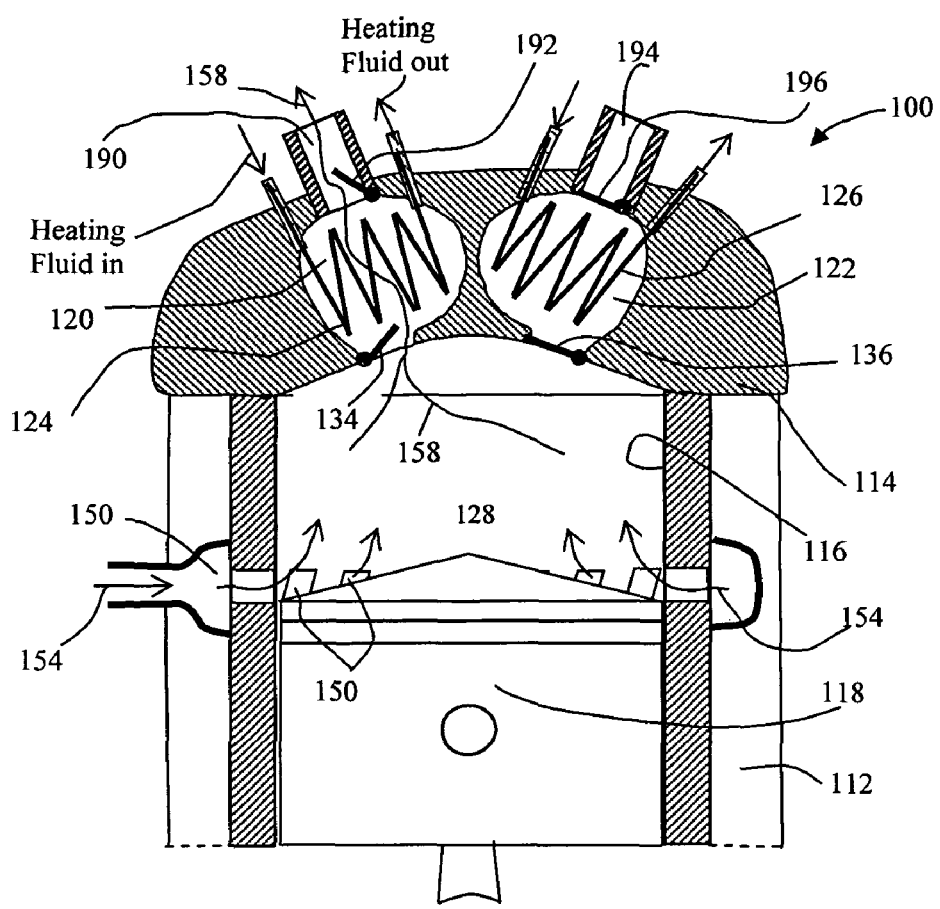
FIG. 18 is a schematic vertical sectional view of a heat engine unit in accordance with the present invention, illustrating the positions of the valves and piston during a scavenging process with the discharge port being directly integrated with the heating chamber.

Also, in the heat engines as shown in FIGS. 10-17, discharge ports are normally separated from the heating chambers. However, the discharge port may be integrated with the heating chamber as shown in FIG. 18, wherein a discharge port 194 in conjunction with a discharge valve 196 is directly integrated with the heating chamber 120 and a discharge port 197 in conjunction with a discharge valve 198 is directly integrated with the heating chamber 122. Through the integrated discharge port 194 or 197, expanded working fluid 158 in the heating chamber in addition to that in the cylinder space may be pushed out of the heating chamber by the intake working fluid 154 and discharged out of the heat engine. Additionally, intake ports in the cylinder head (not in the cylinder wall) may be combined with the discharge port directly integrated with the heating chamber to create a through scavenging process (not shown). Another advantage of using a scavenging process in a heat engine is that the commonly encountered short-circuiting problem in a combustion engine related to unburned fuel loss would no longer exist herein.

Figure 19:
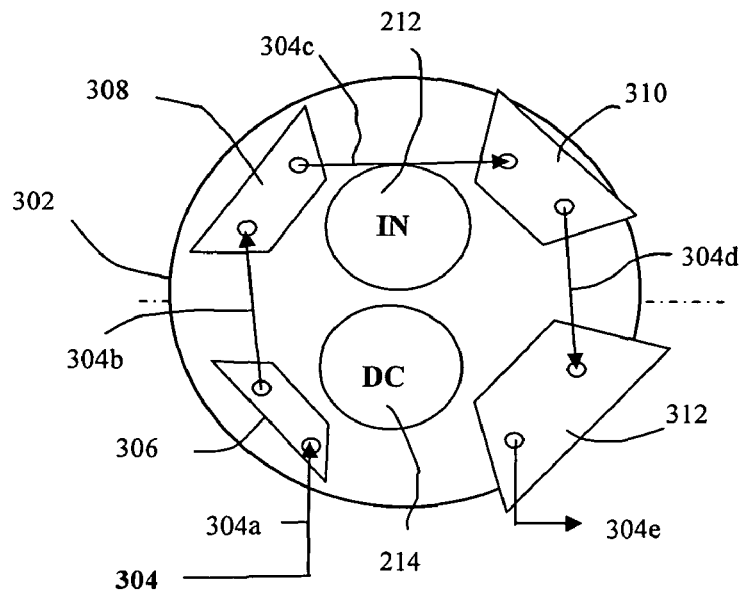
FIG. 19 is a schematic top sectional view of a heat engine unit in accordance with the present invention, illustrating the arrangement of the heating chambers and the flow path of the heating fluid with the configuration of a sequentially increased working fluid volume in the heating chambers along the flow path of the heating fluid.
Figure 19A:
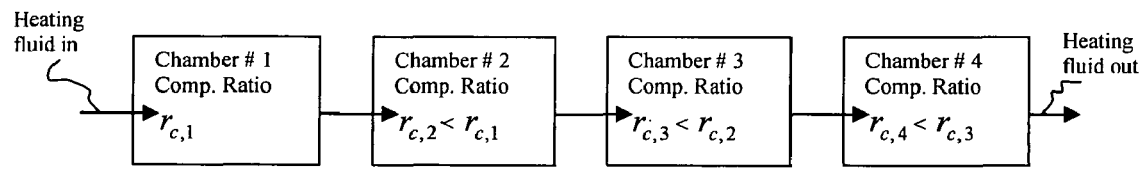
FIG. 19a is a schematic diagram showing the flow path of the heating fluid and the sequential change of the compression ratios of the four heating chambers illustrated in FIG. 19.

For a heat engine in which energy is extracted from a heating fluid through a heat exchanger unit, the heat transfer from the heating fluid to the working fluid of the heat engine, such as air, may be significantly affected by the effective temperature difference between the heating fluid and the air in the heating chamber. A lower compression ratio will produce a lower compressed air temperature at the end of the compression stroke, thus providing a larger temperature difference and a higher heat transfer rate for a given temperature level of the heat source. However, a lower compression ratio will result in a lower thermal efficiency of the engine as the ideal thermal efficiency of the present heat engine may be related to the Otto cycle efficiency:

$$\eta_{Otto} = 1 - \frac{1}{r_c^{k-1}}$$

where $r_c$ is the engine compression ratio and k is the ratio of specific heats. An optimum engine construction would match the temperature level of the heating fluid with an appropriate compression ratio associated with a heating chamber to extract a larger amount of heat from the heating fluid and at the same time maintain a certain level of overall engine thermal efficiency (Generally speaking, a higher local heating fluid temperature would match a higher compression ratio and a lower local heating fluid temperature would match a lower compression ratio). This is accomplished through the flow arrangement of the heating fluid and a sequential variation in the compression ratio for the heating chambers associated with a cylinder. FIG. 19 illustrates a schematic top sectional view of a heat engine unit, showing the arrangement of the heating-fluid flow stream 304 associated with a cylinder 302 and the configuration of four heating chambers associated with the cylinder 302. The four heating chambers have sequentially increased air volume in the flow direction of the heating fluid for sequentially decreased compression ratios associated with the heating chambers. As shown in the figure, the heating fluid 304a enters a heat exchanger unit in a first heating chamber 306 having a relatively small air volume and thus a higher compression ratio when the intake air is compressed into the chamber during the compression stroke associated with the chamber. After transferring an amount of heat to the air in the chamber 306, the heating fluid 304b with a lower temperature is discharged out of the chamber 306 and is then directed to a heat exchanger unit in a second heating chamber 308 having a larger air volume than that of the chamber 306. This larger air volume in the chamber 308 would result in a lower compression ratio than that of the chamber 306 when the intake air is compressed into the chamber 308 during the compression stroke associated with the chamber 308. This reduced the compressed ratio would in turn result in a lower air temperature at the end of the compression stroke associated with the chamber 308. The reduced air temperature is necessary to provide a sufficiently large temperature difference between the heating fluid and the air because of a decreased heating-fluid temperature at the inlet of the chamber 308. After transferring an amount of heat to the air in the second chamber 308, heating fluid 304c is directed to a third heating chamber 310 that has a larger air volume than that of the chamber 308 and subsequently a lower compression ratio than that of the chamber 308. Finally, the heating fluid 304d, after being discharged out of the chamber 310, is directed into a fourth chamber 312 that has a larger air volume than that of the chamber 310 and subsequently a lower compression ratio than that of the chamber 310, and is discharged out of the chamber 312 and the cylinder as 304e with a sufficiently low temperature. The flow path of the heating fluid and the sequential change of the compression ratios for the four heating chambers are illustrated in FIG. 19a. It should be pointed out that the arrangements of the heating-fluid flow path and heating chambers herein may be able to create an equivalency of a counter flow arrangement between the heating fluid and the working fluid of the heat engine.

The low discharging temperature of the heating fluid is essential for enough heat extraction from the heating fluid particularly when the heat fluid is an exhaust gas from an internal combustion engine or an industrial process, or a combustion gas from an external combustion chamber. It should be emphasized that the air volume associate with a heating chamber is different from the volume of the heating chamber, as the air volume in a heating chamber excludes the volume occupied by the heat exchanger and heating fluid as well as the volume of other hardware that may be disposed in the heating chamber.

Figure 20:
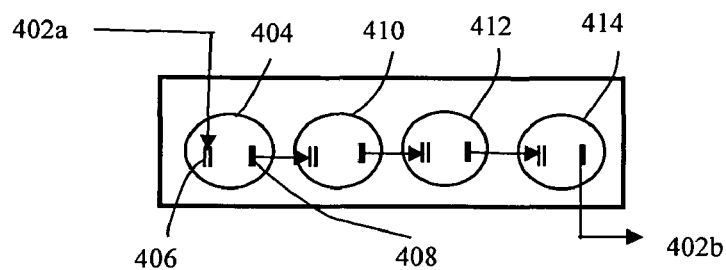
FIG. 20 is a schematic top sectional view of a heat engine in accordance with the present invention, illustrating the arrangement of the cylinders and flow path of the heating fluid with the configuration of a sequentially increased air volume in the heating chambers associated with the cylinders along the flow path of the heating fluid.
Figure 20A:
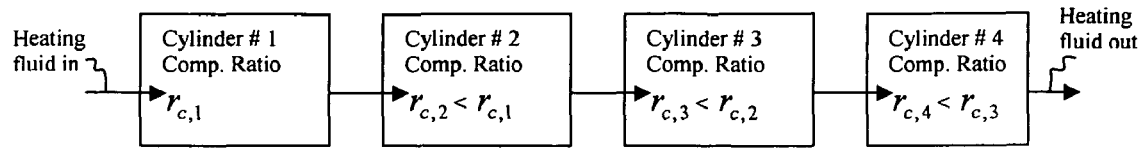
FIG. 20a is a schematic diagram showing the flow path of the heating fluid and the sequential change of the compression ratios associated with the four cylinders illustrated in FIG. 20.

Alternatively, the heating-fluid flow stream arrangement mentioned above may be applied at a cylinder level, as shown in FIG. 20, which illustrates a schematic top sectional view of a heat engine, showing the arrangements of the cylinders and heating-fluid flow stream, with sequentially decreased cylinder compression ratios in the flow direction of the heating fluid. In this figure, heating fluid 402a enters the heating chamber or chambers of a first cylinder 404 through an inlet 406. After transferring amount of heat to the working fluid associated with the first cylinder, the heating fluid is discharged out of the first cylinder 404 through an outlet 408 with a lower temperature. The heating fluid is then directed into the heating chamber or chambers of a second cylinder 410 that has a lower overall compression ratio than that of cylinder 404. This decreased compression ratio may be realized through the increase of overall air volume in the heating chamber or chambers associated with the second cylinder or through the change of the configurations of other engine components such as piston, connecting rod, or crankshaft. Similarly, the third cylinder 412 will have a lower overall compression ratio than that of the second cylinder 410 and the fourth cylinder 414 will have a lower overall compression ratio than that of the third cylinder 412. As a result, after flowing through all these cylinders, the heating fluid 402b is discharged out of the engine with a sufficiently low temperature. The flow path of the heating fluid and the sequential change of the compression ratios associated with the four cylinders are illustrated in FIG. 20a.

Figure 21:
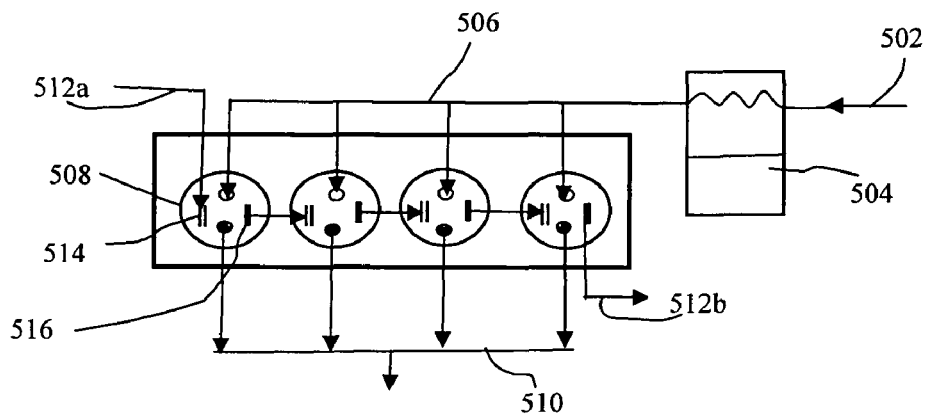
FIG. 21 is a schematic top sectional view of a heat engine in accordance with the present invention, illustrating the arrangement of the cylinders, flow path of the heating fluid, and a refrigeration system with the intake air to the heat engine being cooled by a refrigeration system.
Figure 22:
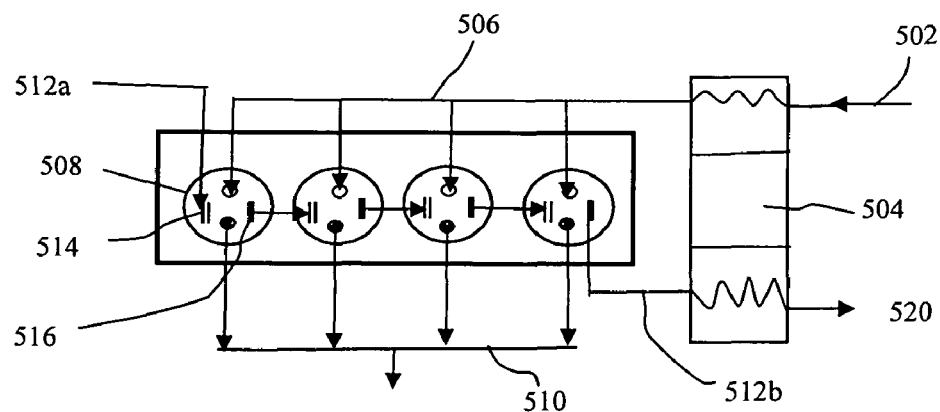
FIG. 22 is a schematic top sectional view of a heat engine in accordance with the present invention, illustrating the arrangement of the cylinders, flow path of the heating fluid, and a heat driven refrigeration system with the intake air to the heat engine being cooled by the heat driven refrigeration system and with the heat input to the heat driven refrigeration system being provided by the heating fluid discharged out of the heat engine.

As mentioned in the above discussion, a lower working fluid temperature at the end of the compression stroke would have the benefit of absorbing more heat from the heating fluid for a given temperature level of the heat source. This is particularly important for applications involving a relatively low heating-fluid temperature such as a geothermal energy related application. Also mentioned in the above discussion is that although a lower compression ratio would reduce the working fluid temperature but at the same time it would reduce the thermal efficiency of the engine. Another approach to overcome this difficulty is to pre-cool the intake working fluid before it is directed into the engine cylinder. FIG. 21 shows a schematic top sectional view of a heat engine, illustrating the arrangement of the cylinders, flow path of the heating fluid, and a refrigeration system with the intake working fluid to the heat engine being cooled by the refrigeration system. As shown in FIG. 21, intake working fluid 502 is cooled through a refrigeration unit 504 before it is directed into the engine intake manifold 506 and distributed into the heating chambers of the cylinders. Also shown in the figure are discharge manifold 510, incoming heating fluid 512a, heating fluid inlet 514 associated with a cylinder 508, heating-fluid outlet 516 associated with the cylinder 508, and heating fluid 512b discharged out of the engine. The refrigeration unit herein may be any type of refrigeration system, including, but not limited to, a vapor compression refrigeration system, an absorption refrigeration system, and an ejector refrigeration system. A preferred type of refrigeration system herein may be a heat driven refrigeration system, such as an absorption refrigeration system or an ejector refrigeration system because of the availability of the heat from the heating fluid, the heating fluid discharged out of the engine, or the working fluid discharged out of the engine. As shown in FIG. 22, the refrigeration unit 504 is a heat-driven refrigeration system, and the heat to drive the refrigeration system is provided by the heating fluid 512b discharged out of the engine. Alternatively, the heat to the refrigeration system may be provided by a heating fluid without flowing through the engine or the working fluid 510 discharged out of the engine (not shown).

Figure 23:
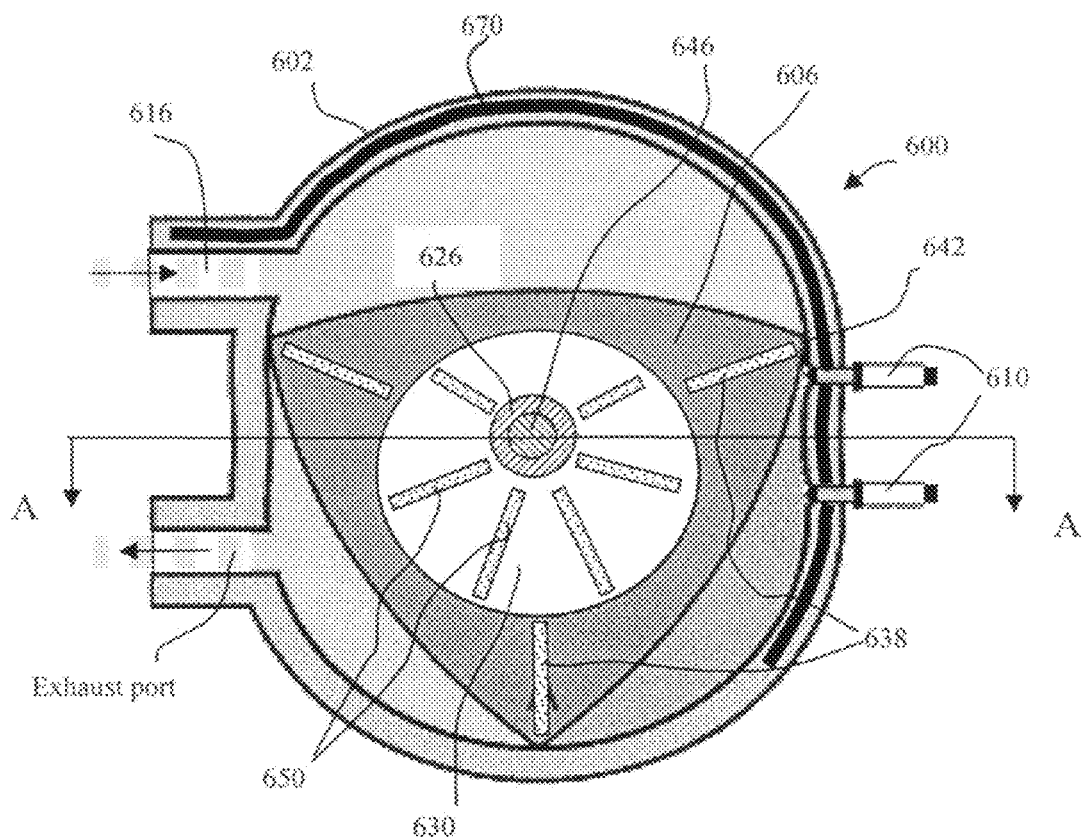
FIG. 23 is a schematic sectional view of a rotary combustion engine in accordance with the present invention, illustrating the disposition of rotating heat pipes and circumferential heat pipes.
Figure 24:
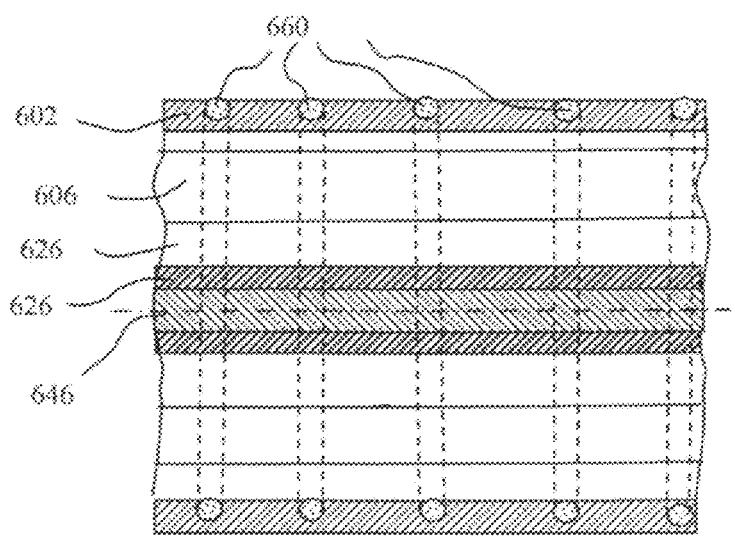
FIG. 24 is a cross-sectional view in the direction A-A of FIG. 23, showing cross sections of circumferential heat pipes and an axially rotating heat pipe.

Having described heat engines based on a piston/cylinder structure, attention now is turning to a rotary engine. As mentioned earlier in this disclosure, a significant problem associated with a rotary combustion engine, such as a Wankel rotary engine, is the cooling of rotor seals. FIG. 23 illustrates a sectioned view of a rotary engine 600 and FIG. 24 is a cross-sectional view in the direction A-A of FIG. 23. Referring now to FIG. 23, the engine 600 comprises an oval-like housing 602 surrounding a rotor 606, at least a fuel ignition device or fuel injector 610, an intake port 616 and an exhaust port 620. The rotor 606 is mounted on an eccentric drive shaft 626 having an offset lobe 630. The eccentric shaft 626 passes through the rotor 606 and is supported by bearings (not shown). A plurality of radially rotating heat pipes 638 is disposed in the rotor for temperature reduction of the seals 642 of the rotor. It is well known that the heat pipe is a heat transfer device that has a very high effective heat conductance and is capable of transferring a large amount heat from one place to another with a small temperature gradient. The radially heat pipe is a type of heat pipe that utilizes centrifugal force to return the condensate from the condenser section to the evaporator section. The heat pipe 638 extends generally in a radial direction from the rotor tip/seal to an inner region of the rotor, and may effectively control the tip/seal temperature within an acceptable range. To further reduce the overall temperature of the rotor as well as the lobe 630, an axially rotating heat pipe 646 may be disposed along the axis of the eccentric drive shaft 626. As a result, the heat transferred from the rotor tips/seals to the inner portion of the rotor may be transferred axially by the axially rotating heat pipe 646 to the outside of the engine housing to be dissipated (not shown). To aid the heat transfer from the rotor 606 to the axially rotating heat pipe 646, intermediate radially rotating heat pipes 650 may be disposed in the lobe 630 of the eccentric shaft as shown in FIG. 23. With the present configuration, the temperature reduction may not be limited to rotor seals; the overall temperature level of the rotor and eccentric lobe may also be reduced. The reduction of the rotor/lobe temperature level may have the benefits of reducing lubricating oil consumption, increasing the durability of the seal materials, maintaining the elasticity of a metallic material, eliminating the need to pump cooling oil to the rotor, and providing possibility of employing seals with tensions at the rotor tips. It should be pointed out that although the geometry of the heat pipes shown in FIG. 23 is schematically cylindrical, many other geometries may be employed to serve the purposes of temperature reduction. Also, both the heat pipes in the rotor and the heat pipes in the lobe of the drive shaft may be interconnected. In this case, individual heat pipes in either the rotor or the lobe shown in the figure may be individual branches of a larger heat pipe assembly (not shown).

Also described earlier in this disclosure is the thermal control of the engine housing 602 in a rotary engine. In this case, a different type of heat pipe may be employed to provide a substantially uniform temperature along the circumference of the housing. Turning now to FIG. 24, a cross-sectional view in the direction A-A of FIG. 23, wherein a plurality of heat pipes 660 are disposed in a longitudinal direction of the housing 602. The heat pipes 660 may extend circumferentially along the circumference of the housing 602 and has a function to effectively transfer heat from the portion of housing wherein combustion takes place to the portion of the housing wherein the intake working fluid enters the housing, and the uneven temperature distribution in the housing may be substantially reduced. Also, there may be no need for all the heat pipes to extend over the entire housing circumference. As shown in FIG. 23, heat pipe 670 may be disposed over a portion of the housing circumference from the combustion chamber to the intake port to reduce the temperature gradient between these two sections of the housing. The condensate returning mechanism of the heat pipes 660 as well as 670 may be different from that of heat pipes 638, and more conventional means such as capillary wick structure or gravitational force may be employed. Also some or all of the circumferential heat pipes as shown may be interconnected to simplify the processing and filling of the heat pipes (not shown).

Figure 25:
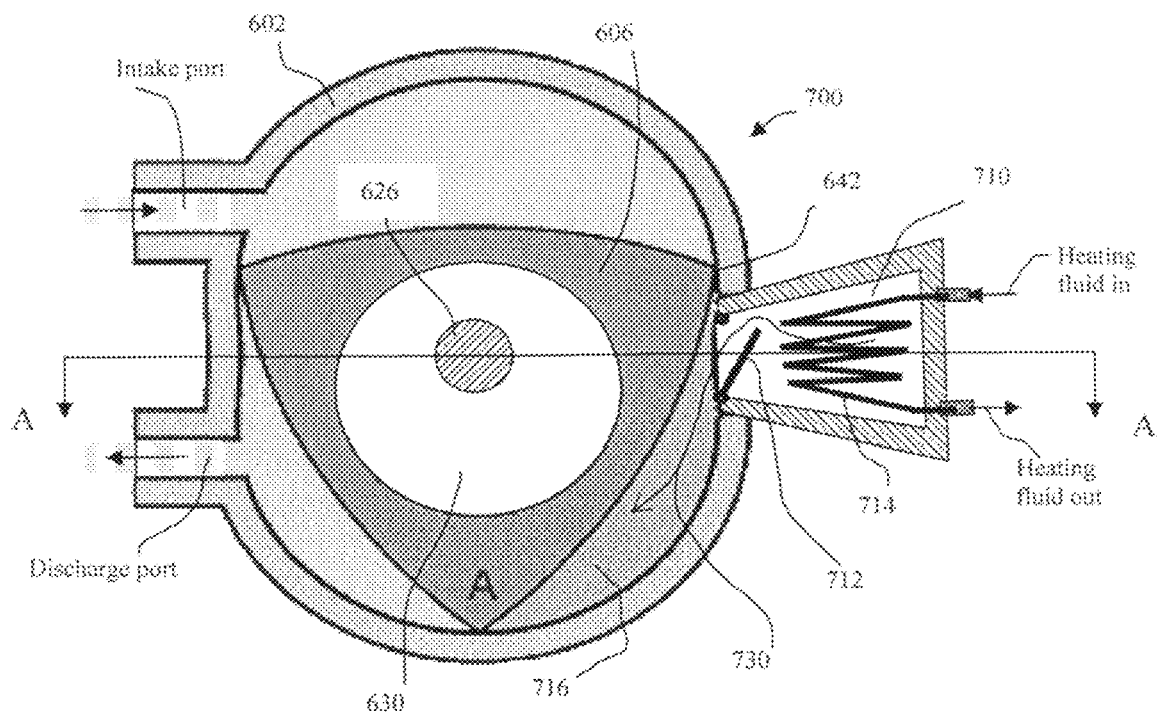
FIG. 25 is a schematic sectional view of a rotary heat engine in accordance with the present invention, illustrating the positions of the valve and rotor during an expansion stage associated with the first heating chamber.
Figure 26:
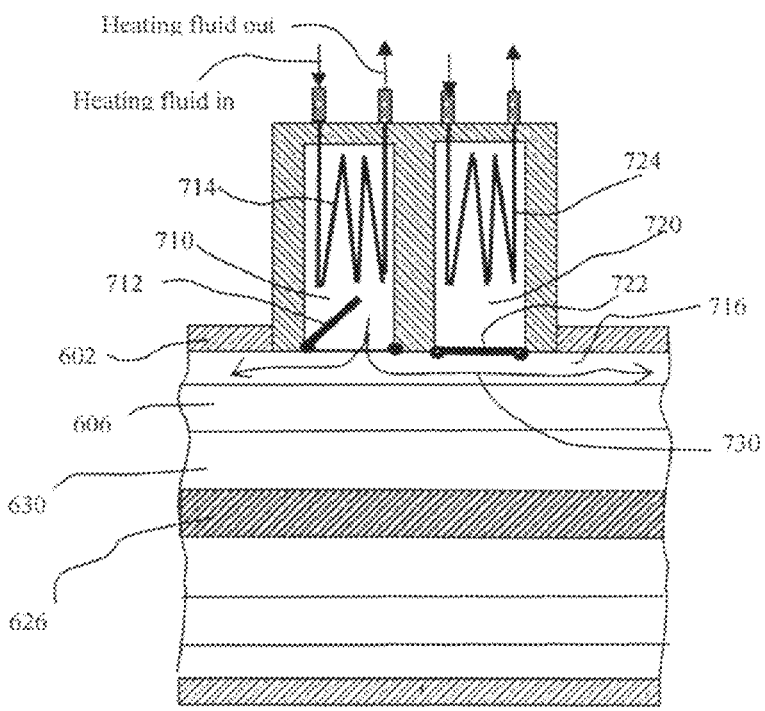
FIG. 26 is a cross-sectional view in the direction A-A of FIG. 25, showing the arrangement of two heating chambers in an axial direction of the rotary heat engine.

So far the description of a rotary engine is related to thermal control of the engine, particularly for a combustion rotary engine. However, the heat engine concept related to reciprocating engine as disclosed earlier may also be employed for a rotary engine. FIG. 25 illustrates a sectioned view of a rotary heat engine 700 with a two heating chamber configuration and FIG. 26 is a cross-sectional view in the direction A-A of FIG. 25, showing a first heating chamber 710 and a second heating chamber 720 that are located in a peripheral location of the housing 602 and are arranged in an axial direction of the housing. Heating chamber 710 has a port in communication with space 716 formed between the inner surface of the housing 602 and the outer surface of the rotor 606, a heating chamber valve 712 that may block or establish communication between the heating chamber 710 and space 716, and a heat exchanger unit 714, wherein a heating fluid flows into the heat exchanger unit through an inlet conduit and flows out of the heat exchanger unit through an outlet conduit. Similarly heating chamber 720 has a heating chamber valve 722 and a heat exchanger unit 724.

More specifically, the conditions shown in FIGS. 25 and 26 correspond to a power stage associated with the first heating chamber 710, wherein chamber valve 712 is opened and the working fluid 730 (such as air) having a higher temperature and a higher pressure is released from chamber 710 and flows both radially and axially into space 716 to deliver work to the rotor 606, while chamber valve 722 associated with the second heating chamber 720 has been closed since the completion of the compression stage in the last cycle, enclosing an amount of compressed working fluid in the chamber, and heat is being transferred from the heating fluid through the heat exchanger unit 724 into the working fluid enclosed therewithin.

Following the power stage comes the compression stage for the first heating chamber wherein the first heating chamber valve 712 remains open and an amount of intake working fluid is compressed into the first heating chamber 710 while the second heating chamber remains closed (not shown).

The next stage is the power stage for the second heating chamber 720, wherein chamber valve 722 is opened, and after an extended heating period, the working fluid in the second heating chamber 720 expands into space 716 to deliver work to the rotor 606, while the first heating chamber 710 is closed, enclosing an amount of compressed working fluid in the chamber, and heat is being transferred from the heating fluid to the working fluid enclosed therewithin through the heat exchanger unit 714 (not shown).

The last stage for the cycle is the compression stage for the second heating chamber 720, wherein the second heating chamber valve 722 remains open and an amount of intake working fluid is compressed into the second heating chamber 720 while the first heating chamber remains closed (not shown).

For the above operation with a two heating chamber configuration, each chamber is given a time period of two stages for heat transfer from the heating fluid to the working fluid enclosed. However, if this time period is still not sufficient, more than two heating chambers per rotor may be employed. In this case, the time period available for heat transfer under a constant volume may be 2(n−1) stages, where n is the number of heating chambers per rotor.

Figure 27:
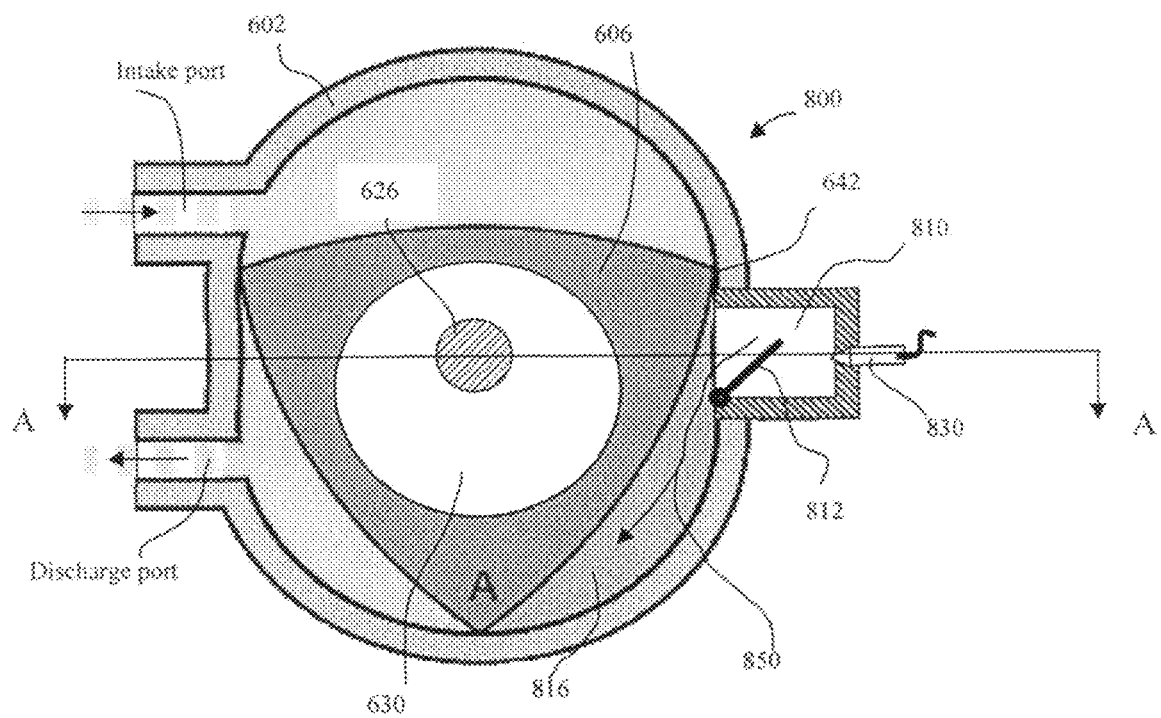
FIG. 27 is a schematic sectional view of a rotary combustion engine in accordance with the present invention, illustrating the positions of the valves and rotor during an expansion stage associated with the first combustion chamber.
Figure 28:
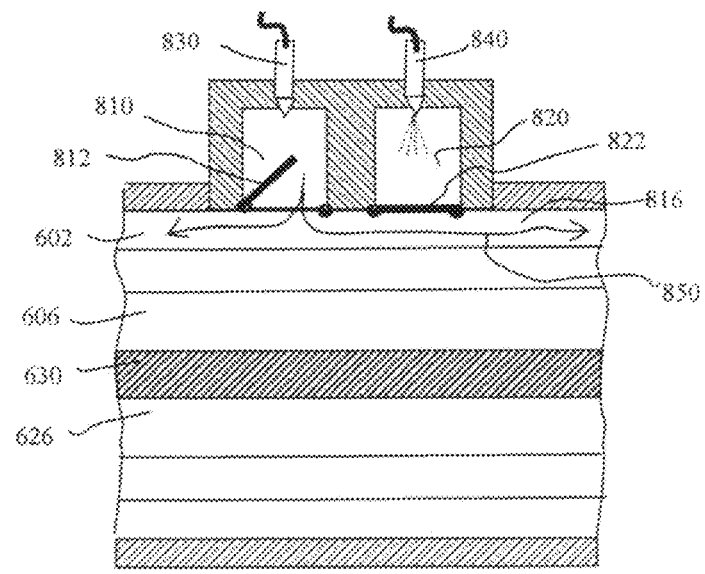
FIG. 28 is a cross-sectional view in the direction A-A of FIG. 27, showing the arrangement of two combustion chambers in an axial direction of the rotary combustion engine.

Returning now to a rotary combustion engine as discussed before, a significant problem normally associated with a rotary combustion engine is that the time available for a fuel to be ignited and burnt in the combustion chamber or be injected into the combustion chamber is significantly shorter as the rotating speed of the engine is increased, which may cause excessive hydrocarbon emission and a reduction in fuel efficiency. Similar to the multiple heating chamber approach for a heat engine, a multiple combustion chamber approach may be employed to overcome this difficulty. FIG. 27 illustrates a sectioned view of a rotary combustion engine 800 employing two combustion chambers per rotor, and FIG. 28 is a cross-sectional view in the direction A-A of FIG. 27, showing a first combustion chamber 810 and a second combustion chamber 820 that are located in a peripheral location of the housing 602 and are arranged in an axial direction of the housing. Combustion chamber 810 has a port in communication with space 816 formed between the inner surface of the housing 602 and the outer surface of the rotor 606, a combustion chamber valve 812 that may block or establish communication between the combustion chamber 810 and space 816. Similarly combustion chamber 820 has a combustion chamber valve 822 that may block or establish communication between the combustion chamber 820 and space 816. Also, a first fuel ignition device or a first fuel injector, 830, is disposed for the first combustion chamber 810, and a second fuel ignition device or a second fuel injector, 840, is disposed for the second combustion chamber 820. More specifically, the conditions shown in FIGS. 27 and 28 correspond to a power stage associated with the first combustion chamber 810, wherein chamber valve 812 is opened, and combustion gas 850 is released from combustion chamber 810 and flows both radially and axially into space 816 to deliver work to rotor 606, while the second combustion chamber 820 is closed, enclosing an amount of charge entering the chamber 820 in the last cycle, and fuel is ignited through the ignition device for a homogeneous charge rotary engine or fuel is injected into the chamber for a compression-ignition rotary engine. For the above operation with two combustion chambers per rotor, each chamber is given a time period of two stages available for combustion in the combustion chamber under a closed chamber condition, although the timing for ignition or fuel injection may be flexible. For many rotary combustion engines, this time period may be sufficient for a substantial completion of the combustion. However, if this time period is still not sufficient, more than two combustion chambers for a rotor may be employed. In this case, the time period available for combustion may be 2(n−1) stages, where n is the number of combustion chambers per rotor.

It should be pointed out that although the rotary heat engines as described herein may have a different mechanical structure, the various discussions such as those for heating chambers, heat exchangers, and valves as well as the intake and discharge processes in this disclosure associated with the piston/cylinder heat engines will be readily applicable to a rotary engine because of similar operating principles, and therefore will not be repeated.

Having described in detail the configurations and working principles of different engines in accordance with the present invention, some issues that are common to these engines are discussed herein. It is well known that in a heat engine the heat transfer rate between the working fluid such as air and the heat exchanger unit will be significantly affected by the motion of the working fluid relative to heat exchanger surfaces such as solid walls and fins. The motion of the working fluid in the heating chamber may be generated during the compression process when the intake working fluid is compressed into the heating chamber from the cylinder space. Similar to the concept of auxiliary chamber or pre-chamber in an internal combustion engine, the motion of the working fluid may be enhanced through shaping the passage between the cylinder space and the heating chamber so that near the end of the compression stroke, a vigorous working fluid flow is set up in the heating chamber or the working fluid would rotate rapidly within the heating chamber. This vigorous flow or rotation would provide a foundation for a high heat transfer rate between the working fluid enclosed and the heat exchanger surface. However, to provide a sufficiently large amount of heat transfer during the time period when the working fluid is being enclosed, the vigorous flow or rotation should be sustained without significant decay over this time period. For a heat engine having two heating chambers per cylinder and operating at a speed of 3000 rpm, the holding time for the working fluid within a heating chamber would be only 0.04 second based on a holding period of two revolutions. Because of this very short time period, significant decay of the vigorous flow or rotation may not be expected for most of heat engine operations. However for some situations, particularly for a heating chamber with a small compression ratio or a low speed, the flow strength generated during the compression may not be sufficiently strong or the duration of vigorous flow or rotation in a heating chamber may not be sufficiently long after the completion of the compression stroke, a turning wheel may be disposed within a heating chamber to generate sufficiently strong fluid motion in the chamber. The wheel may be driven by a mechanism external of the heating chamber. Alternatively the wheel may be driven by the incoming working fluid to the heating chamber during the compression stroke with the option of attaching a flywheel to the turning wheel external or internal of the heating chamber.

Figure 29:
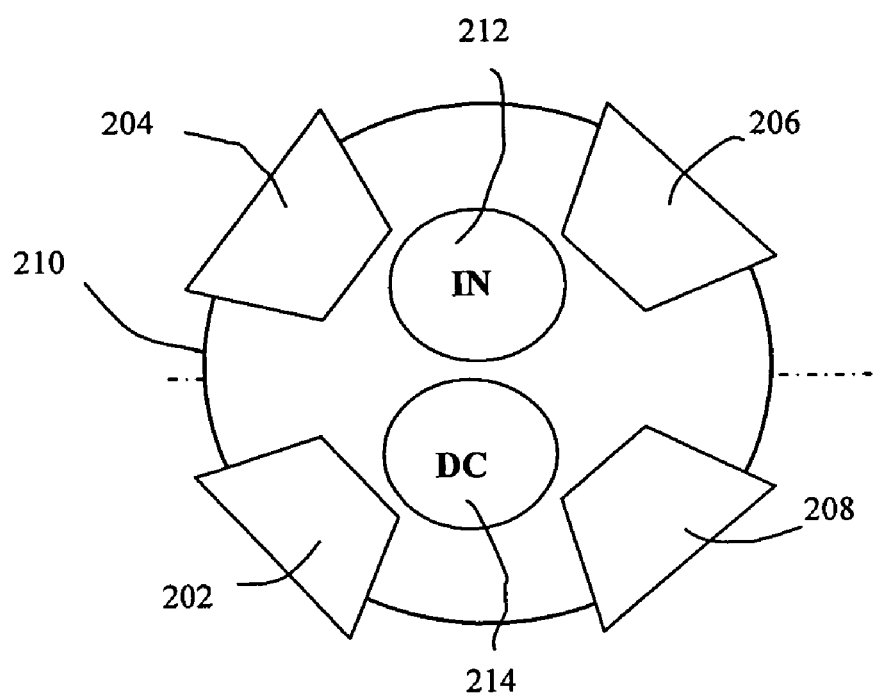
FIG. 29 is a schematic diagram showing a configuration of four heating chambers per cylinder in connection with over expansion mechanisms.

Finally, based on the same platform, the heat engine disclosed in this invention may be adapted to work on a cycle having a greater expansion ratio than the compression ratio to increase the thermal efficiency of the heat engine. The cycles with such as feature is described in terms of a configuration of four heating chambers per cylinder as shown in FIG. 29 with the air as the working fluid for convenience. In this case, the first heating chamber 202 and the second heating chamber 204 would share an intake stroke and a compression stroke while the third heating chamber 206 and the fourth heating chamber 208 would share an intake stroke and a compression stroke, and the heat engine may operate on a twelve essential stroke cycle. These twelve strokes in the cycle would include: (1) an intake stroke for the first and second heating chambers, in which an amount of air is admitted into the cylinder space while the third and fourth heating chambers are closed and the air entering the third and fourth heating chambers in the last cycle is being heated under a constant volume by a heating fluid; (2) a compression stroke associated with the first and second heating chambers, in which both chamber valves respectively associated with the first and second heating chambers are opened and an amount intake air is compressed into both the first and second heating chambers while the third and fourth heating chambers remain closed; (3) a power stroke for the third heating chamber, in which the chamber valve associated with the third heating chamber is opened and higher pressure/higher temperature air from the third heating chamber expands into cylinder space, delivering work to the piston, while the fourth chamber and the first and second chambers remain closed. The intake air entering the first and second heating chambers in the preceding compression stroke is being heated by a heating fluid; (4) a discharge stroke associated with the third heating chamber in which expanded air after delivering work is discharged out of the cylinder space while all other chambers remain closed; (5) a power stroke for the fourth chamber in which the chamber valve associated with the fourth heating chamber is opened and higher pressure/higher temperature air from the fourth heating chamber expands into cylinder space, delivering work to the piston, while the third chamber is closed and the first and second chambers remain closed; (6) a discharge stroke associated with the fourth heating chamber in which expanded air after delivering work is discharged out of the cylinder space while the first and second chambers remain closed; (7) an intake stroke for the third and fourth heating chambers, in which an amount of air is admitted into the cylinder space while the first and second heating chambers remain closed; (8) a compression stroke associated with the third and fourth heating chambers, in which both chamber valves respectively associated with the third and fourth chambers are opened and an amount intake air is compressed into both the third and fourth heating chambers while the first and second heating chambers remain closed; (9) a power stroke for the first chamber in which the chamber valve associated with the first heating chamber is opened and higher pressure/higher temperature air from the first heating chamber expands into cylinder space, delivering work to the piston, while all other heating chambers are closed, and the air entering the third and fourth heating chambers in the preceding compression stroke is heated under a constant volume by a heating fluid; (10) a discharge stroke associated with the first heating chamber in which expanded air after delivering work is discharged out of the cylinder space while the other chambers remain closed; (11) a power stroke for the second chamber in which the chamber valve associated with the second heating chamber is opened and higher pressure/higher temperature air from the second heating chamber expands into cylinder space, delivering work to the piston, while the first heating chamber is closed and the third and fourth heating chambers remain closed; and (12) a discharge stroke associated with the second heating chamber in which expanded air after delivering work is discharged out of the cylinder space while the third and fourth chambers remain closed.

It may be readily shown that in the above cycle, the ratio of the expansion ratio to the compression ratio is $$r_e/r_c = 2(1 - 1/r_c) + 1/r_c$$

where $r_e$ and $r_c$ are respectively the expansion and compression ratios. When $r_c$ is 6, $r_e/r_c = 1.70$, which indicates that the increase in the expansion ratio is about 83%. With this amount of increase, the thermal efficiency improvement may be in the range of 10-20%.

One skilled in the art may recognize that the duration of the air being heated under a constant volume in the second heating chamber (1440 CA) may be greater than that in the first heating chamber (1080 CA), and the duration of the air being heated under a constant volume in the fourth heating chamber (1440 CA) may be greater than that in the third heating chamber (1080 CA). However, this asymmetric condition may be eliminated by exchange the roles of the first and second chambers and the roles of the third and fourth chambers in a next cycle. Additionally, the above four-chamber configuration may be increased to 6 and the engine may operate on an eighteen-stroke cycle. In general, with n chambers per cylinder and each two chambers share an intake stroke and a compression stroke, where n is an integer, the engine may operate on a 3n stroke cycle. In a particular situation with n=2, both chambers share an intake stroke and a compression stroke, and the engine may operate on a six-stroke cycle. With this configuration, however, one of the chambers may lose the benefit of having an extended heating period under a constant volume before the expansion stroke. Furthermore for this two-chamber, six-stroke cycle situation, if the chamber valve is removed from one of the chambers, the benefit of a greater expansion ratio than the compression ratio may also be reduced.

Still with the issue of a greater expansion ratio than the compression ratio, the concept of scavenging may be employed to replace some of the intake and discharge strokes to reduce the number of strokes per power stroke. With the same four chamber configuration shown in FIG. 29 and the introduction of scavenging, the engine may operate on an eight-stroke cycle, which would include a compression stroke for both the first and second heating chambers, a power stroke for the third heating chamber, a discharge stroke for the third heating chamber, a power stroke for the fourth heating chamber, a scavenging process for the fourth and third chambers, a compression stroke for the fourth and third chambers, a power stroke for the first heating chamber, a discharge stroke for the first heating chamber, a power stroke for the second heating chamber, and a scavenging process for the second and first chambers. In general, with n chambers per cylinder and each two chambers sharing a compression stroke, the engine may operate on a 2n stroke cycle. In a particular situation with n=2, both chambers share a compression stroke, and the engine may operate on a four-stroke cycle. With this configuration, however, one of the chambers may lose the benefit of having an extended heating period under a constant volume before the expansion stroke. Furthermore for this two-chamber, four-stroke cycle situation, if the chamber valve is removed from one of the chambers, the benefit of a greater expansion ratio than the compression ratio may also be reduced. In the above descriptions, each two chambers would share an intake stroke or a compression stroke. The configuration of more than two chambers that share a compression stroke may also be considered although it is not elaborated herein.

It should be noted that although the embodiments of the heat engine so far are based largely on the structure of an Otto-type engine, a diesel-type engine, a two-stroke scavenging type engine, or a rotary-type engine, the spirit of the invention may also be applicable to heat engine based on the structures of other types of engines, such as a paired piston engine or a reciprocating free piston engine without a crankshaft Additionally, the heat engines disclosed herein may have a closed-loop configuration in terms of discharge and intake. In this case, instead of discharging expanded working fluid such as air into the ambient and admitting air from the ambient as the intake working fluid, the expanded working fluid may be discharged into a conduit and is directed to an external heat exchanger to reduce its temperature, and the working fluid with a reduced temperature then returns through the conduit to the inlet of the engine as the intake working fluid (not shown). This closed-loop configuration may also be a necessity for a heat engine using a working fluid other than air for an increased heat transfer performance.

As disclosed earlier, the applications of the present heat engines are diverse. It should be pointed out that many commonly known or logical approaches related to a specific application may also be within the spirit of the present invention. For example, in an application related to an external combustion engine, the heat source is the combustion gas from an external combustion chamber. In this case, the working fluid (air in this case) discharged out of the heat engine may be delivered to the external combustion chamber as an air supply to the combustion process in the combustion chamber. This delivery may have the benefit of recovering an amount of available energy from the discharged working fluid because the temperature of the discharged working fluid is normally above the ambient temperature. Also, before the discharged working fluid is delivered to the external combustion chamber, it may be directed to a heat exchanger to recover an amount of heat from the combustion gas (as a heating fluid) discharged out the heat engine.

It will thus be seen that the invention effectively attains the objectives set forth above. It is intended that all matter contained in the above specification or shown in the accompanying drawings be interpreted as illustrative and not in a limiting sense. The several cycles described in this disclosure are just a few options in accordance with the heat engine platform of this invention. Many other cycles not mentioned in this disclosure would still be possible in the spirit of providing a sufficiently long heating time period for the working fluid enclosed in a heating chamber before the power stroke without increasing the number of strokes per power stroke in a cycle. The descriptions regarding the positions or conditions of various engine components, such as valves, piston, cylinder, or heating chambers, are representative in nature for illustrating operating principles of the heat engine according to the present invention. For example, when it is stated that a heating chamber is closed or opened at the top dead center in a stroke, it does not exclude the occurrence of an early closing or an early opening of the heating chamber in the stroke. Any variation of the subject invention will be apparent to those skilled in the art after considering this specification together with the accompanying drawings.

What is claimed is:

1. A heat engine that employs a working fluid without involving combustion comprising:
    at least a piston and cylinder assembly including a piston reciprocatingly mounted within a cylinder space,
    an intake port,
    a discharge port,
    at least a heating chamber having a heat exchanger unit associated with said piston and cylinder assembly and disposed therewithin,
    a port leading to said cylinder space, and
    a heating-chamber valve,
        wherein said heating-chamber valve opens or closes said port to establish or blocks the flow of a gaseous working fluid between said heating chamber and cylinder space,
        wherein the number of heating chambers associated with a piston-cylinder assembly is n and at least two of the chambers share a compression stroke,
        wherein n is an integer, and
        wherein said engine operates on a 2n stroke cycle for said engine employing scavenging processes for some of the intake and discharge purposes.

2. A heat engine that employs a working fluid without involving combustion comprising:
    at least a piston and cylinder assembly including a piston reciprocatingly mounted within a cylinder space,
    an intake port,
    a discharge port,
    at least a heating chamber having a heat exchanger unit associated with said piston and cylinder assembly and disposed therewithin,
    a port leading to said cylinder space, and
    a heating-chamber valve,
        wherein said heating-chamber valve opens or closes said port to establish or blocks the flow of a gaseous working fluid between said heating chamber and cylinder space,
    wherein the number of heating chambers associated with a piston-cylinder assembly is n and at least two of the chambers share a compression stroke,
        wherein n is an integer, and
    wherein said engine operates on a 3n stroke cycle having an expansion ratio being greater than the compression ratio.

3. A heat engine that employs a working fluid without involving combustion comprising:
    at least a piston and cylinder assembly including a piston reciprocatingly mounted within a cylinder space,
    an intake port,
    a discharge port,
    at least a heating chamber having a heat exchanger unit associated with said piston and cylinder assembly and disposed therewithin,
    a port leading to said cylinder space, and
    a heating-chamber valve,
        wherein said heating-chamber valve opens or closes said port to establish or blocks the flow of a gaseous working fluid between said heating chamber and cylinder space,
        wherein said heat engine operates on a cycle having 2n strokes,
        wherein n is an integer being equal to or greater than two, each
        wherein said heating chamber in said cycle has an associated scavenging process, a compression stroke with an amount of working fluid being compressed into said heating chamber, and a power stroke, and
        wherein a time period is available for heat being transferred from a heat source to the working fluid that is enclosed within said heating chamber between the compression stroke and the power stroke while said piston works with the working fluid associated with another heating chamber, thereby in said cycle the time period for said heat to be transferred from said heat source to the working fluid is increased.

4. The heat engine as described in claim 3, wherein said heat source is a heating fluid and said heating fluid flows serially through the heating chambers associated with said piston and cylinder assembly with the heating fluid flowing out of an upstream heating chamber being directed to the inlet of a downstream heating chamber having a greater working fluid volume than the working fluid volume of said upstream heating chamber, thereby the compression ratios associated with the heating chambers are sequentially decreased to match a decreased heating fluid temperature in the flow direction of the heating fluid.

5. The heat engine as described in claim 3, wherein the heat source is a heating fluid and said heating fluid flows serially through the heating chambers of the cylinders associated with said heat engine with the heating fluid flowing out of an upstream cylinder being directed to a downstream cylinder having a working fluid volume in its heating chambers greater than that of said upstream cylinder, thereby the compression ratios associated with the cylinders are sequentially decreased to match a decreased heating fluid temperature in the flow direction of the heating fluid.

6. The heat engine as described in claim 3, wherein the motion of the working fluid in the heating chamber relative to the heat exchanger surface is enhanced through shaping the passage between the cylinder space and the heating chamber so that near the end of a compression stroke, a vigorous working fluid flow is set up in the heating chamber or the working fluid rotates rapidly within the heating chamber.

7. The heat engine as described in claim 3, wherein the heat being transferred from said heat source to the working fluid of the heat engine is through a heat pipe system.

8. A heat engine that employs a working fluid without involving combustion comprising:
   at least a piston and cylinder assembly including a piston reciprocatingly mounted within a cylinder space,
   an intake port,
   a discharge port,
   at least a heating chamber having a heat exchanger unit associated with said piston and cylinder assembly and disposed therewithin, a port leading to said cylinder space, and
   a heating-chamber valve,
      wherein said heating-chamber valve opens or closes said port to establish or blocks the flow of a gaseous working fluid between said heating chamber and cylinder space,
      wherein said heat engine operates on a cycle having 4n strokes,
         wherein n is an integer being equal to or greater than two,
      wherein said heating chamber in said cycle has an associated intake stroke and a compression stroke with an amount of working fluid being compressed into said heating chamber, a power stroke and a discharge stroke, and
   wherein a time period is available for heat being transferred from a heat source to the working fluid that is enclosed within said heating chamber between the compression stroke and the power stroke, while said piston works with the working fluid associated with another heating chamber, thereby in said the time period for said heat to be transferred from said heat source to the working fluid is increased.

9. The heat engine as described in claim 8, wherein said heat source is a heating fluid and said heating fluid flows serially through the heating chambers associated with said piston and cylinder assembly with the heating fluid flowing out of an upstream heating chamber being directed to the inlet of a downstream heating chamber having a greater working fluid volume than the working fluid volume of said upstream heating chamber, thereby the compression ratios associated with the heating chambers are sequentially decreased to match a decreased heating fluid temperature in the flow direction of the heating fluid.

10. The heat engine as described in claim 8, wherein the heat source is a heating fluid and said heating fluid flows serially through the heating chambers of the cylinders associated with said heat engine with the heating fluid flowing out of an upstream cylinder being directed to a downstream cylinder having a working fluid volume in its heating chambers greater than that of said upstream cylinder, thereby the compression ratios associated with the cylinders are sequentially decreased to match a decreased heating fluid temperature in the flow direction of the heating fluid.

11. The heat engine as described in claim 8, wherein the motion of the working fluid in the heating chamber relative to the heat exchanger surface is enhanced through shaping the passage between the cylinder space and the heating chamber so that near the end of a compression stroke, a vigorous working fluid flow is set up in the heating chamber or the working fluid rotates rapidly within the heating chamber.

12. The heat engine as described in claim 8, wherein the heat being transferred from said heat source to the working fluid of the heat engine is through a heat pipe system.

* * * * *